United States Patent
Ren et al.

(10) Patent No.: US 10,586,102 B2
(45) Date of Patent: Mar. 10, 2020

(54) SYSTEMS AND METHODS FOR OBJECT TRACKING

(71) Applicant: QUALCOMM Incorporated, San Diego, CA (US)

(72) Inventors: Jianfeng Ren, San Diego, CA (US);
Feng Guo, San Diego, CA (US);
Ruiduo Yang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 213 days.

(21) Appl. No.: 14/829,406

(22) Filed: Aug. 18, 2015

(65) Prior Publication Data

US 2017/0053167 A1    Feb. 23, 2017

(51) Int. Cl.
| | |
|---|---|
| *G06K 9/00* | (2006.01) |
| *G06T 7/246* | (2017.01) |
| *G06K 9/46* | (2006.01) |
| *G06T 3/40* | (2006.01) |

(52) U.S. Cl.
CPC ....... *G06K 9/00624* (2013.01); *G06K 9/4604* (2013.01); *G06T 3/40* (2013.01); *G06T 7/246* (2017.01); *G06T 2207/30241* (2013.01)

(58) Field of Classification Search
CPC . G06T 3/40; G06T 7/246; G06T 2207/30241; G06T 2210/12; G06K 9/00624; G06K 9/4604

See application file for complete search history.

(56) References Cited

U.S. PATENT DOCUMENTS

| | | | | |
|---|---|---|---|---|
| 7,177,447 | B2* | 2/2007 | Olson | G06K 9/6203 |
| | | | | 382/103 |
| 7,269,284 | B2* | 9/2007 | Chamberlain | G06K 9/4604 |
| | | | | 360/69 |
| 8,670,604 | B2 | 3/2014 | Eggert et al. | |
| 9,683,836 | B2* | 6/2017 | Sandhawalia | G01B 11/24 |
| | | (Continued) | | |

FOREIGN PATENT DOCUMENTS

| | | |
|---|---|---|
| CN | 103426184 A | 12/2013 |
| WO | 2008088880 A1 | 7/2008 |

OTHER PUBLICATIONS

Climent-Pérez et al. "Telemetry-based search window correction for airborne tracking." International Symposium on Visual Computing. Springer, Cham, 2014. (Year: 2014).*

(Continued)

*Primary Examiner* — Katrina R Fujita
(74) *Attorney, Agent, or Firm* — Austin Rapp & Hardman, P.C.

(57) ABSTRACT

A method performed by an electronic device is described. The method includes obtaining a first frame of a scene. The method also includes performing object recognition of at least one object within a first bounding region of the first frame. The method further includes performing object tracking of the at least one object within the first bounding region of the first frame. The method additionally includes determining a second bounding region of a second frame based on the object tracking. The second frame is subsequent to the first frame. The method also includes determining whether the second bounding region is valid based on a predetermined object model.

18 Claims, 18 Drawing Sheets

(56) References Cited

U.S. PATENT DOCUMENTS

| | | | |
|---|---|---|---|
| 2002/0159643 A1* | 10/2002 | DeYong | G06K 9/00 382/228 |
| 2008/0273752 A1* | 11/2008 | Zhu | B60W 40/02 382/103 |
| 2009/0066790 A1* | 3/2009 | Hammadou | G08B 13/19636 348/143 |
| 2010/0272363 A1* | 10/2010 | Steinberg | G06K 9/00228 382/190 |
| 2013/0272570 A1* | 10/2013 | Sheng | G06F 3/017 382/103 |
| 2014/0003713 A1* | 1/2014 | Seow | G06T 5/009 382/164 |
| 2014/0163703 A1* | 6/2014 | Chang | G08B 13/19608 700/90 |
| 2014/0205141 A1 | 7/2014 | Gao et al. | |
| 2015/0206018 A1 | 7/2015 | Cho et al. | |
| 2015/0222859 A1* | 8/2015 | Schweid | G06K 9/00624 348/148 |
| 2016/0034027 A1* | 2/2016 | Sheng | G06F 3/005 345/173 |
| 2016/0328856 A1* | 11/2016 | Mannino | G06T 7/73 |

OTHER PUBLICATIONS

Aycard O., et al., "An Occupancy Grid Based Architecture for ADAS," Advanced Microsystems for Automotive Applications, 2010, pp. 199-210.

Cho H., et al., "A Multi-Sensor Fusion System for Moving Object Detection and Tracking in Urban Driving Environments," IEEE International Conference on Robotics and Automation (ICRA), 2014, pp. 1836-1843.

Zhong B., et al., "Robust Tracking via Patch-Based Appearance Model and Local Background Estimation," Neurocomputing, 2014, vol. 123, pp. 344-353.

International Search Report and Written Opinion—PCT/US2016/041191—ISA/EPO—dated Feb. 14, 2017.

Nebehay G., "Robust Object Tracking Based on Tracking-Learning-Detection Diplomarbeit", May 8, 2012, XP055339076, pp. 1-60. Retrieved from the Internet: URL:http://www.gnebehay.com/publications/master_thesis/master_thesis.pdf.

Yilmaz A., et al., "Object Tracking", ACM Computing Surveys, ACM, New York, NY, US, vol. 38, No. 4, Dec. 25, 2006, XP058090583, pp. 1-45.

Kalal Z., et al., "Forward-Backward Error: Automatic Detection of Tracking Failures," International Conference on Pattern Recognition 2010, Aug. 23-26, 2010, Istanbul, Turkey, pp. 2756-2759, XP31771139.

\* cited by examiner

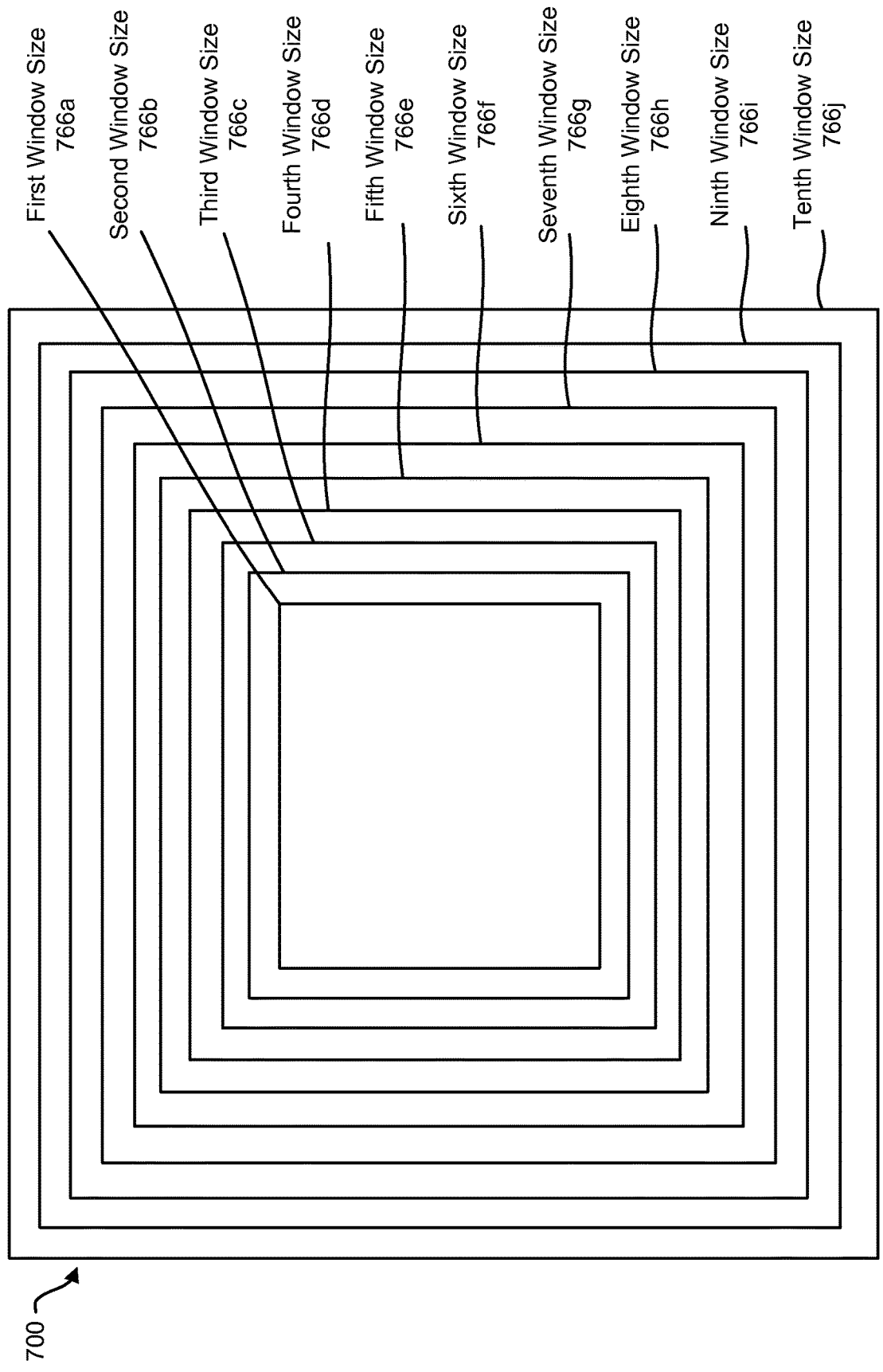

SYSTEMS AND METHODS FOR OBJECT TRACKING

FIELD OF DISCLOSURE

The present disclosure relates generally to electronic devices. More specifically, the present disclosure relates to systems and methods for object tracking.

BACKGROUND

Some electronic devices (e.g., cameras, video camcorders, digital cameras, cellular phones, smart phones, computers, televisions, automobiles, personal cameras, action cameras, surveillance cameras, mounted cameras, connected cameras, robots, drones, smart applications, healthcare equipment, set-top boxes, etc.) capture and/or utilize images. For example, a smartphone may capture and/or process still and/or video images. Processing images may demand a relatively large amount of time, memory and energy resources. The resources demanded may vary in accordance with the complexity of the processing.

It may be difficult to detect and/or track objects in images. For example, tracking may be lost in some situations. As can be observed from this discussion, systems and methods that improve image processing may be beneficial.

SUMMARY

A method performed by an electronic device is described. The method includes obtaining a first frame of a scene. The method also includes performing object recognition of at least one object within a first bounding region of the first frame. The method further includes performing object tracking of the at least one object within the first bounding region of the first frame. The method additionally includes determining a second bounding region of a second frame based on the object tracking. The second frame is subsequent to the first frame. The method also includes determining whether the second bounding region is valid based on a predetermined object model.

The method may include performing object detection of the at least one object. The method may also include obtaining the predetermined object model corresponding to the object.

The method may include extracting one or more features based on the first bounding region. The method may also include updating object tracking based on the one or more features.

The method may include determining whether the object is within the second bounding region if the second bounding region is invalid. The method may also include refining the second bounding region if the object is within the second bounding region. Refining the second bounding region may include resizing the second bounding region to exclude one or more pixels that do not correspond to the object. The method may include detecting the object in a third frame after the second frame if the object is not within the second bounding region.

The method may include performing assisted driving based on the object. The method may also include obtaining the predetermined object model corresponding to the object. Obtaining the predetermined object model may include selecting the predetermined object model from predetermined object models. At least one of the predetermined object models may include a predetermined object model of a traffic sign.

An electronic device is also described. The electronic device includes a processor. The processor is configured to obtain a first frame of a scene. The processor is also configured to perform object recognition of at least one object within a first bounding region of the first frame. The processor is further configured to perform object tracking of the at least one object within the first bounding region of the first frame. The processor is additionally configured to determine a second bounding region of a second frame based on the object tracking. The second frame is subsequent to the first frame. The processor is also configured to determine whether the second bounding region is valid based on a predetermined object model.

A computer-program product is also described. The computer-program product includes a non-transitory tangible computer-readable medium with instructions. The instructions include code for causing an electronic device to obtain a first frame of a scene. The instructions also include code for causing the electronic device to perform object recognition of at least one object within a first bounding region of the first frame. The instructions further include code for causing the electronic device to perform object tracking of the at least one object within the first bounding region of the first frame. The instructions additionally include code for causing the electronic device to determine a second bounding region of a second frame based on the object tracking. The second frame is subsequent to the first frame. The instructions also include code for causing the electronic device to determine whether the second bounding region is valid based on a predetermined object model.

An apparatus is also described. The apparatus includes means for obtaining a first frame of a scene. The apparatus also includes means for performing object recognition of at least one object within a first bounding region of the first frame. The apparatus further includes means for performing object tracking of the at least one object within the first bounding region of the first frame. The apparatus additionally includes means for determining a second bounding region of a second frame based on the object tracking. The second frame is subsequent to the first frame. The apparatus also includes means for determining whether the second bounding region is valid based on a predetermined object model.

BRIEF DESCRIPTION OF THE DRAWINGS

FIG. 7A is a block diagram illustrating an image window having different window sizes that may be used with the present systems and methods;

DETAILED DESCRIPTION

Object tracking may include locating an object in a series of images (from frame to frame, for example). Tracking an object in a series of images (e.g., image data, image frames, video, etc.) and/or a user defined region of interest in those images using a camera may be difficult. Real-time performance (~30 frames per second (fps)) may be required. Some configurations may combine the output of an optical flow-based tracker and an image content-based detector to obtain robust tracking. However, the computation of the existing algorithms make it difficult to achieve real-time performance.

The present systems and methods may implement one or more of the following techniques to improve the speed of the tracking and detection algorithms: (1) using a fraction of possible detection (e.g., scanning) windows at each frame (e.g. randomly select the window positions or utilize a scanning pattern); (2) selecting only a limited range of spatial scales (e.g., only a subset of available spatial scales) for object detection that are close in scale to a scale corresponding to a previous detected target size; (3) based on the confidence value of previous tracking, determining either to search for the object in a partial image or the entire image; (4) dynamically adjusting the number of the detection windows based on previous tracking results; (5) performing tracking and detection sequentially (e.g., applying the tracker first, since it is less computationally expensive); (6) running an object detector only when the confidence of the tracker is lower than a threshold; and (7) setting a number of scanning steps proportional to a total number of image locations. One of the advantages of the present methods and systems is to reduce computations used to track and/or detect a target object.

As used herein, the term "track" and its variants refer to a process that is motion-based, not identifying a specific object. For example, an object tracking and detection module may track motion from frame to frame and determine a location, size or frame of the target object based on movement of an electronic device (e.g., if the camera is panning) or movements of objects from frame to frame. The term "detect" and its variants refers to a process that attempts to identify a target object and/or a type of target object, e.g., by comparing a portion of a frame to a reference image. For example, an object tracking and detection module may compare portions of captured frames to a reference image (of the target object) in an attempt to identify a target object.

In one example, detection may be used when a target can no longer be tracked (e.g., if an object falls outside the field of view). Systems and methods of performing motion-based tracking and object detection are explained in greater detail below.

Figure 1:
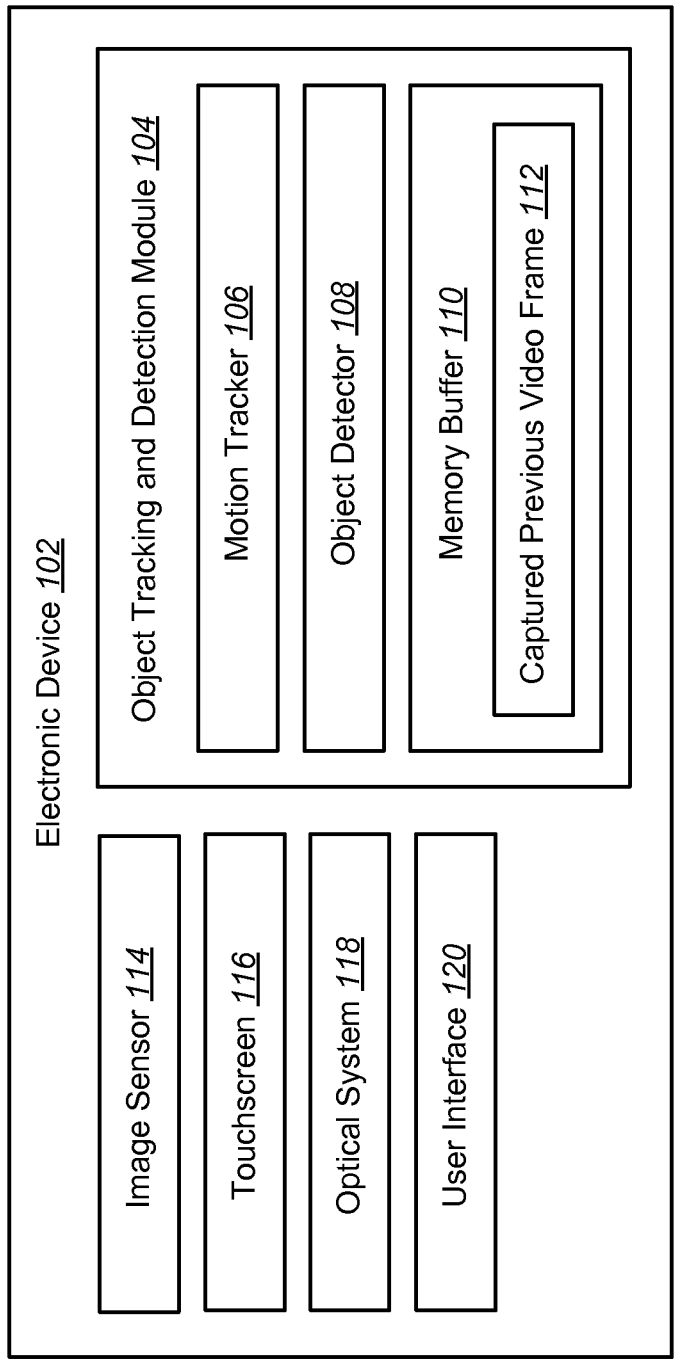
FIG. 1 is a block diagram illustrating an electronic device for tracking and detecting a target object.

FIG. 1 is a block diagram illustrating an electronic device 102 for tracking and detecting a target object. Examples of electronic devices 102 include laptop or desktop computers, cellular phones, smart phones, wireless modems, e-readers, tablet devices, gaming systems, robots, aircraft, unmanned aerial vehicles (UAVs), automobiles, wearable devices, personal cameras, action cameras, mounted cameras, etc. Some of these devices may operate in accordance with one or more industry standards.

An electronic device 102, such as a smartphone or tablet computer, for example, may include a camera. The camera may include an image sensor 114 and an optical system 118 (e.g., lenses) that focuses images of objects that are located within the field of view of the optical system 118 onto the image sensor 114. An electronic device 102 may also include a camera software application and a display screen. When the camera application is running, images of objects that are located within the field of view of the optical system 118 may be recorded by the image sensor 114 and may be displayed on the display screen. The present systems and methods may be described in terms of one or more images and/or video frames interchangeably.

A user interface 120 of the camera application may permit one or more objects that are being displayed on the display screen to be tracked. The user of the electronic device 102 may be permitted to select the object(s) that is/are to be tracked and/or detected. Additionally or alternatively, the object to be tracked (e.g., face, eye, person, shape, box, etc.) may be predetermined and/or may conform to a model.

In one configuration, the display is a touchscreen 116 that receives input from physical touch, e.g., by a finger, stylus or other tool. In some configurations, the touchscreen 116 may receive touch input (e.g., touch point, drawn enclosure such as a circle or box) defining a target object to be tracked and/or detected. In some configurations, the electronic device 102 may automatically determine a target object for tracking and/or detection. In some configurations, multiple objects may be tracked.

The electronic device 102 may include an object tracking and detection module 104 for tracking a selected object and/or detecting the object in a video frame. The object tracking and detection module 104 may include a motion tracker 106 for tracking one or more objects and/or an object detector 108 for detecting an object on a video frame.

The motion tracker 106 may be motion-based for tracking motion of points on an image (e.g., a video frame) from frame to frame to estimate the location and/or change of location of a target object between a previous video frame and a current video frame. The object detector 108 may use an object model, rather than a motion-based model, to detect an object by comparing all or a portion of a current video frame to a selected object or portion of a captured previous video frame 112 (e.g., in a sequence of video frames). The object detector 108 may be used for detecting multiple objects within a video frame. In some configurations, the object detector 108 may scan one or more frames and/or images in order to detect a particular object. The object detector 108 may scan one or more frames as described herein.

The object tracking and detection module 104 may also include a memory buffer 110. The memory buffer 110 may store one or more captured frames and data associated with the captured video frames. In one example, the memory buffer 110 may store a previous captured video frame 112. The object tracking and detection module 104 may use data provided from the memory buffer 110 about a captured previous video frame 112 in performing motion-based tracking and/or object detection. In some configurations, the memory buffer 110 may provide location and window size data to the motion tracker 106 and the object detector 108 may provide the motion tracker 106 and object detector 108 one or more parameters that may be used to more accurately track and/or detecting the object.

The electronic device 102 may perform motion-based tracking. One approach is a median flow method, in which the motion tracker 106 accepts a pair of images $I_t$, $I_{t+1}$ (e.g., video frames) and a bounding box $\beta_t$ and outputs a bounding box $\beta_{t+1}$. A set of points may be initialized on a rectangular grid within the bounding box $\beta_t$ and tracks the points to generate a sparse motion flow between $I_t$ and $I_{t+1}$. A quality of the point prediction may be estimated and each point assigned an error. A portion (e.g., 50%) of the worst predictions may be filtered out while the remaining predictions are used to estimate the displacement of the whole bounding box. The motion tracker 106 may perform motion-based tracking on each video frame captured by an electronic device 102. In another approach, motion-based tracking may be performed by calculating one or more gradients (e.g., x and y gradients) and using the difference between a pair of frames to calculate a time gradient and using the multiple gradient values to accurately track a target object within a current video frame. Further details regarding motion-based tracking are provided below.

When performing motion-based tracking, the motion tracker 106 may determine a tracking confidence value (between 0 and 1, for example) based on a calculated or estimated accuracy of the motion-tracking method. The tracking confidence value may indicate a likelihood or probability that a target object falls within a current video frame or a defined window of the video frame. If the tracking confidence value is greater than a tracking threshold, the likelihood may be high that the target object is found within the current video frame. Otherwise, the likelihood may be low or uncertain whether the target object is found within the current video frame. Various approaches for determining a tracking confidence value may be used (e.g., calculating a normalized cross correlation (NCC) between a tracked window (e.g., a tracking patch window) in a current video frame and previously stored image patches from previously captured video frames).

The electronic device 102 may also perform object detection. Object detection may be performed using a variety of approaches (e.g., scanning window, scanning step, etc.). For example, all or a subset of all possible window locations and sizes may be searched in a video frame.

In some configurations, the motion tracker 106 and object detector 108 may operate sequentially rather than in parallel. For example, the electronic device 102 may perform motion-based tracking of a selected object (e.g., target object) and sequentially perform object detection of the selected object based on one or more tracked parameters (e.g., a region of a target object, a window location, a window size, a scale level, a target size, a tracking and/or detection confidence value or other parameter). For example, if a tracking confidence value is below a tracking threshold, the electronic device 102 may perform object detection. Alternatively, if a tracking confidence value is above a tracking threshold, the electronic device 102 may skip object detection for a current video frame and continue performing motion-based tracking on a next video frame based on the motion tracking results of the current video frame. Because motion-based tracking may be less computationally intensive than object detection, an electronic device 102 may skip performing object detection where motion-based tracking may be used to accurately track a target object within a current video frame.

Figure 2:
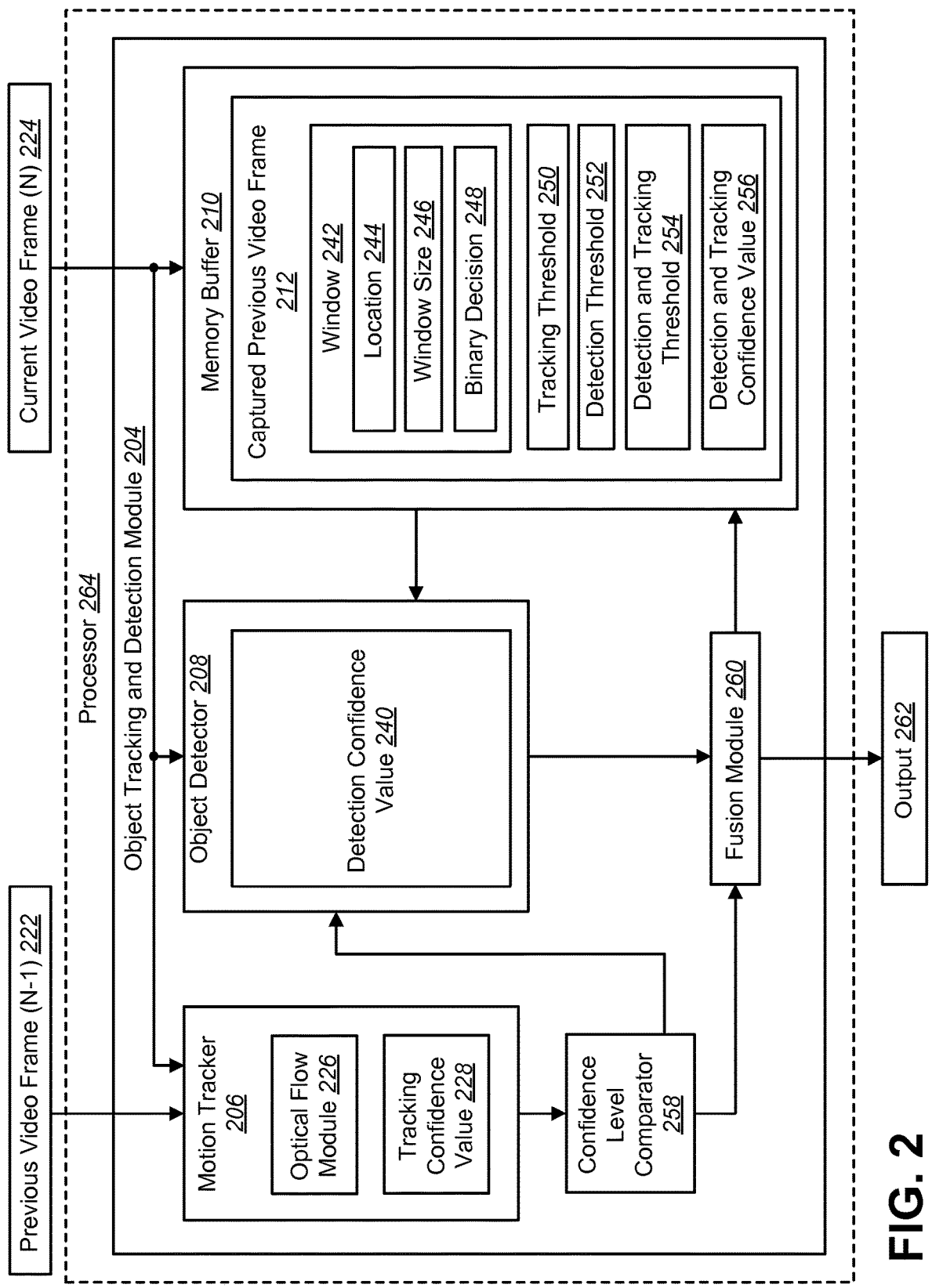
FIG. 2 is a block diagram illustrating an object tracking and detection module.

FIG. 2 is a block diagram illustrating an object tracking and detection module 204. The object tracking and detection module 204 may be implemented within an electronic or wireless device (e.g., electronic device 102). The object tracking and detection module 204 may include a motion tracker 206 having an optical flow module 226 and a tracking confidence value 228. The object tracking and detection module 204 may also include an object detector 208 having a detection confidence value 240. The memory buffer 210 may store data associated with a captured previous video frame 212 that may be provided to the motion tracker 206 and object detector 208. The object tracking and detection module 204, motion tracker 206, object detector 208 and memory buffer 210 may be configurations of the corresponding elements described above in connection with FIG. 1.

The motion tracker 206 may be used to perform motion-based tracking on a current video frame (N) 224. For example, a previous video frame (N−1) 222 and a current video frame (N) 224 may be received (e.g., by the electronic device 102). The previous video frame (N−1) 222 may immediately precede a current video frame (N) 224 in a sequence of video frames. Additional video frames may be obtained and processed by the object tracking and detection module 204. The previous video frame (N−1) 222 may be provided to a motion tracker 206. Further, the memory buffer 210 may store data associated with the previous video frame (N−1) 222, referred to herein as a captured previous video frame 212. In some configurations, the memory buffer 210 may obtain information about the previous video frame (N−1) 222 directly from the electronic device 102 (e.g., from the camera). The memory buffer 210 may also obtain tracking results about the previous video frame (N−1) 222 from the fusion module 260 which may specify where an object was tracked and/or detected in the previous video frame (N−1) 222. This information about the previous video frame (N−1) 222 or other previously captured video frames may be stored in the memory buffer 210.

The motion tracker 206 may subsequently receive a current video frame (N) 224 in a sequence of video frames. The motion tracker 206 may compare the current video frame (N) 224 to the previous video frame (N−1) 222 (e.g., using information provided from the memory buffer 210). The motion tracker 206 may track motion of an object on the current video frame (N) 224 using an optical flow module 226. The optical flow module 226 may include hardware and/or software for performing motion-based tracking of an object on a current video frame (N) 224. By comparing the previous video frame (N−1) 222 and the current video frame (N) 224, the motion tracker 206 may determine a tracking confidence value 228 associated with the likelihood that a target object is in the current video frame (N) 224. In one example, the tracking confidence value 228 is a real number (e.g., between 0 and 1) based on a percentage of certainty that the target object is within the current video frame (N) 224 or a window within the current video frame (N) 224.

The object detector 208 may be used to detect an object on a current video frame (N) 224. For example, the object detector 208 may receive a current video frame (N) 224 in a sequence of video frames. The object detector 208 may perform object detection on the current video frame (N) 224 based on a tracked parameter (e.g., tracking confidence value 228 compared to a tracking threshold 250 and/or information provided from the memory buffer 210 (e.g., a region, a window location, a window size, or other information).

The object detector 208 may select multiple windows within a video frame. The selected scanning windows may follow a particular scanning pattern (e.g., sliding window, scanning step, etc.). More detail is given in connection with FIGS. 11-16. The object detector 208 may determine whether some or all of a target object is found in a specific window. The object detector 208 may determine a detection confidence value 240 indicating a likelihood that the target object is present within a current video frame (N) 224. The object detector 208 may perform object detection according to a variety of tracked parameters, including a region, target size, window size, scale level, window location and/or one or more confidence values.

The object detector 208 may search all or a subset of window locations and/or sizes. If detection is unsuccessful (e.g., the detection confidence value 240 is less than a detection threshold 252 (e.g., 0.6, 0.65, 0.7, 0.75, 0.8, 0.85, etc.)), a higher percentage of window locations may be searched in a subsequent captured frame, e.g., 2%.

The object tracking and detection module 204 may include a fusion module 260 to merge multiple windows to form a single window. There may be initially two confidence values: a detection confidence value 240 from the object detector 208 and a tracking confidence value 228 from the motion tracker 206. The fusion module 260 may compare and/or combine the two confidence values (e.g., pick the one that is larger) into a detection and tracking confidence value 256. The detection and tracking confidence value 256 may serve as an overall indication of the likelihood that a target object was found. Further, the detection and tracking confidence value 256 may be a parameter used for determining image scale, window location, window size or percentage of windows to search in a next video frame. The fusion module 260 may be used to provide information (e.g., window location, window size, etc.) about a current video frame (N) 224 and/or a detection and tracking confidence value 256 to the memory buffer 210. The fusion module 260 may use the tracking results (e.g., bounding boxes) from the motion tracker 206 and object detector 208 to form a combined tracking result (e.g., bounding box) and calculate the detection and tracking confidence value 256.

The memory buffer 210 may store one or more values associated with the previous video frame (N−1) 222, the current video frame (N) 224 or other captured video frames. In one configuration, the memory buffer 210 stores a captured previous video frame 212, which may include information corresponding to the previous video frame (N−1) 222. The captured previous video frame 212 may include information about one or more windows 242 (e.g., location 244, window size 246, a binary decision 248, etc.) for each window 242. Additionally or alternatively, the captured previous video frame 212 may include information about the image scale (e.g., scale level) in which the object was last detected and/or tracked.

The captured previous video frame 212 may also include a tracking threshold 250, detection threshold 252 and a detection and tracking threshold 254. The tracking threshold 250 may be provided to the motion tracker 206 or circuitry on the object tracking and detection module 204 (e.g., confidence level comparator 258) to determine whether the tracking confidence level is greater than the tracking threshold 250. The detection threshold 252 may be provided to the object detector 208 or other circuitry on the object tracking and detection module 204 to determine whether the detection confidence value 240 is greater than the detection threshold 252. The detection and tracking threshold 254 may be a combined value based on the tracking threshold 250 and the detection threshold 252. The detection and tracking threshold 254 may be compared to a detection and tracking confidence value 256 to determine a combined confidence value for the motion-based tracking and the object detection. Each of the thresholds may be based on a likelihood that a target object is located within a video frame. The object tracking and detection module 204 may perform motion-based tracking and/or detection on a current video frame (N) 224 until a specific detection and tracking confidence value 256 is obtained. Further, the motion-based tracking and object detection may be performed on each video frame in a sequence of multiple video frames.

In one configuration of a two-step tracking and detection approach, the motion tracker 206 may perform motion-based tracking on a current video frame (N) 224. The motion tracker 206 may determine a tracking confidence value 228 based on the motion-based tracking process. Using the tracking confidence value 228 and a tracking threshold 250 provided by the memory buffer 210, a confidence level comparator 258 may determine whether the tracking confidence value 228 exceeds a tracking threshold 250. If the tracking confidence value 228 is greater than the tracking threshold 250, the object tracking and detection module 204 may skip performing object detection and provide the tracking result to a fusion module 260 to produce an output 262. The output 262 may include an indication that a target object is within a current video frame (N) 224. Further, the output 262 may include additional information about the target object.

If the tracking confidence value 228 does not exceed the tracking threshold 250, the object detector 208 may subsequently perform object detection on the current video frame (N) 224. The object detection may be performed on all or a subset of windows within the current video frame (N) 224. The object detector 208 may determine a detection confidence value 240 and compare the detection confidence value 240 to a detection threshold 252. If the detection confidence value 240 is above a detection threshold 252, the object detector 208 may provide the detection result to the fusion module 260 to produce an output 262. The output 262 may include an indication that a target object is within a current video frame (N) 224 and/or include additional information about the detected object. If the detection confidence value 240 is less than or equal to a detection threshold 252, the object detector 208 may perform object detection again using a more robust method (e.g., searching a greater number of windows within the current video frame (N) 224) and may repeat the process of object detection until a satisfactory detection confidence value 240 is obtained. The object tracking and detection module 204 may be used to perform tracking and detection on a next video frame.

One or more of the illustrated components in FIG. 2 may be optionally implemented by a processor 264. One or more of the illustrated components may be implemented together or separately on one or more processors.

Figure 3:
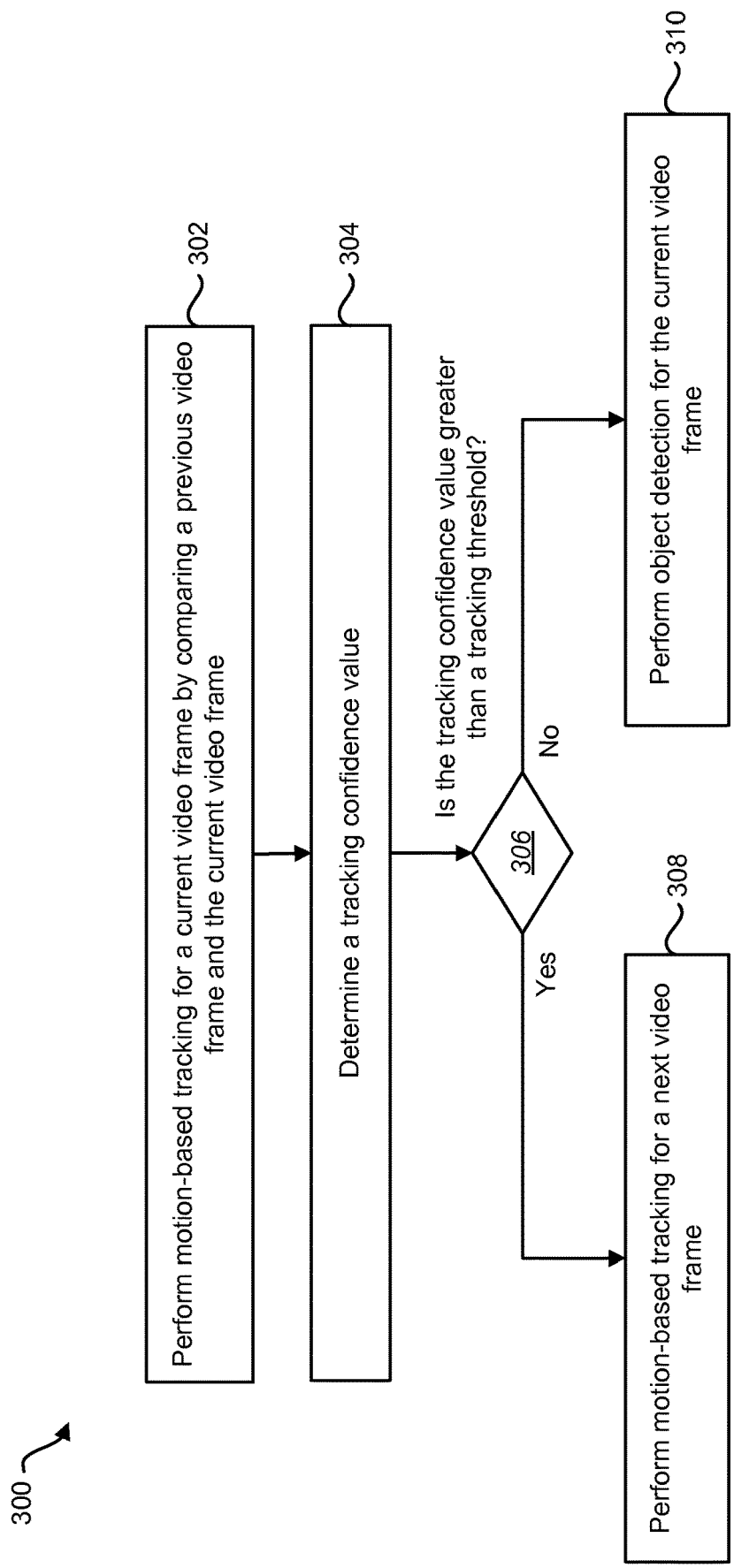
FIG. 3 is a flow diagram illustrating a method for performing motion-based tracking and object detection.

FIG. 3 is a flow diagram illustrating a method 300 for performing motion-based tracking and object detection. The method 300 may be implemented by an electronic device 102, e.g., an object tracking and detection module 104. The electronic device 102 may perform 302 motion-based tracking as described above.

The electronic device 102 may determine 304 a tracking confidence value 228. This may be accomplished as described above. The electronic device 102 may determine 306 whether the tracking confidence value 228 is greater than a tracking threshold 250. If the tracking confidence value 228 is greater than the tracking threshold 250, the electronic device 102 may perform 308 motion-based tracking for a next video frame (and optionally skip performing object detection on the current video frame (N) 224 based on the result of the motion-based tracking). Otherwise, the electronic device 102 may perform 310 object detection for the current video frame (N) 224 (or the next video frame, for instance).

Figure 4:
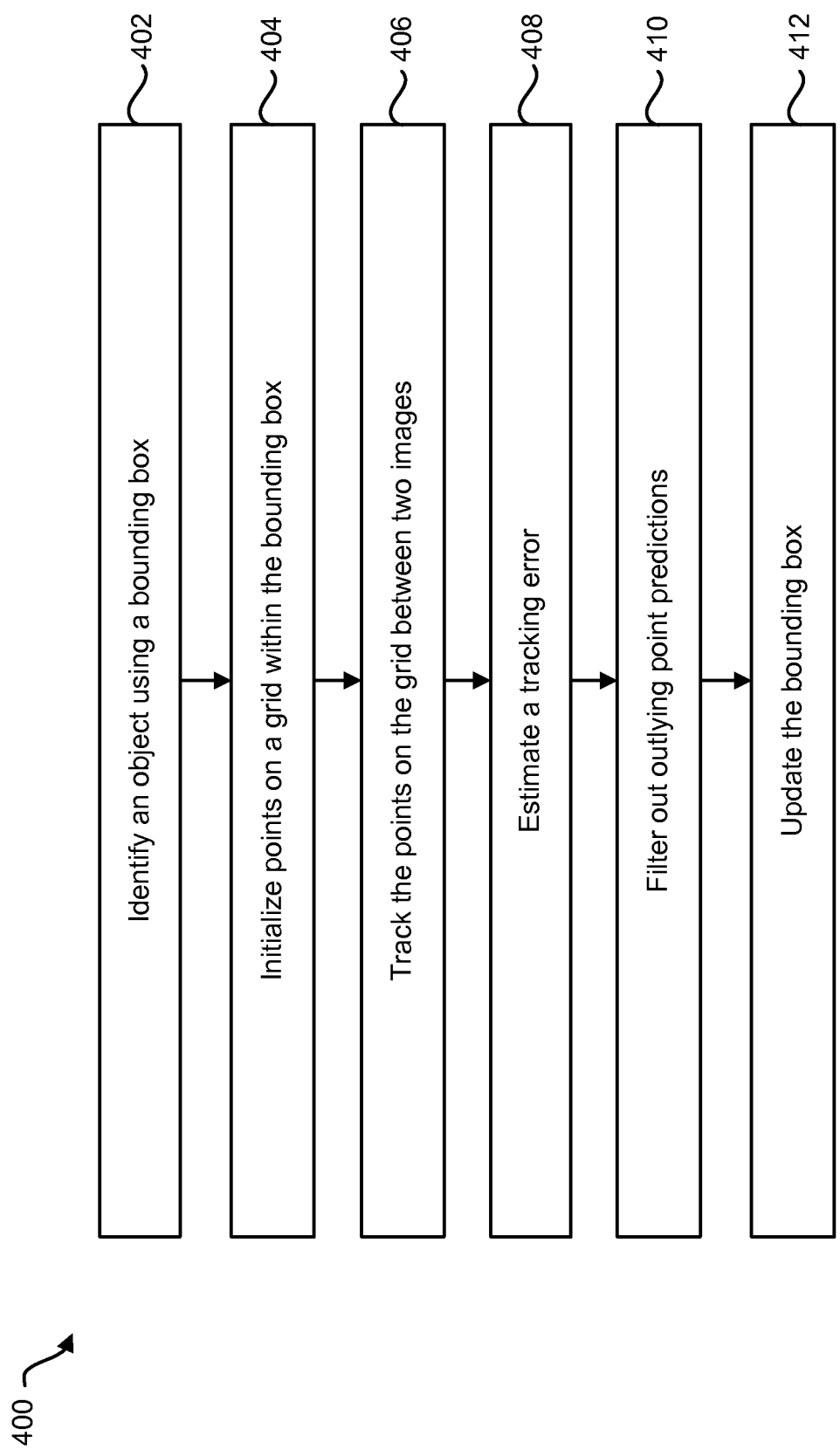
FIG. 4 is a flow diagram illustrating a method for performing motion-based tracking.

FIG. 4 is a flow diagram illustrating a method 400 for performing motion-based tracking. The method 400 may be implemented by an electronic device 102, e.g., an object tracking and detection module 104. The electronic device 102 may identify 402 one or more target objects using a bounding box as described above.

The electronic device 102 may initialize 404 points on a grid within the bounding box. The points on the grid may be uniformly spaced throughout the bounding box. Further, the points may be tracked 406 (using a Lucas-Kanade tracker, for example) on the grid between two images (e.g., a previous video frame (N−1) 222 and current video frame (N) 224). The electronic device 102 may estimate 408 a tracking error (e.g., assign each point of the tracked points an error value, estimate forward-backward error, NCC and/or sum-of-square differences, etc.) between the two images. The estimated tracking error may be used to obtain a tracking confidence value 228. Further, the electronic device 102 may filter 410 out outlying point predictions (e.g., 50% of the worst predictions). The remaining predictions may be used to estimate the displacement of the bounding box.

The electronic device 102 may update 412 the bounding box. Updating 412 the bounding box may be performed such that the updated bounding box becomes the new bounding box for the next video frame.

Figure 5:
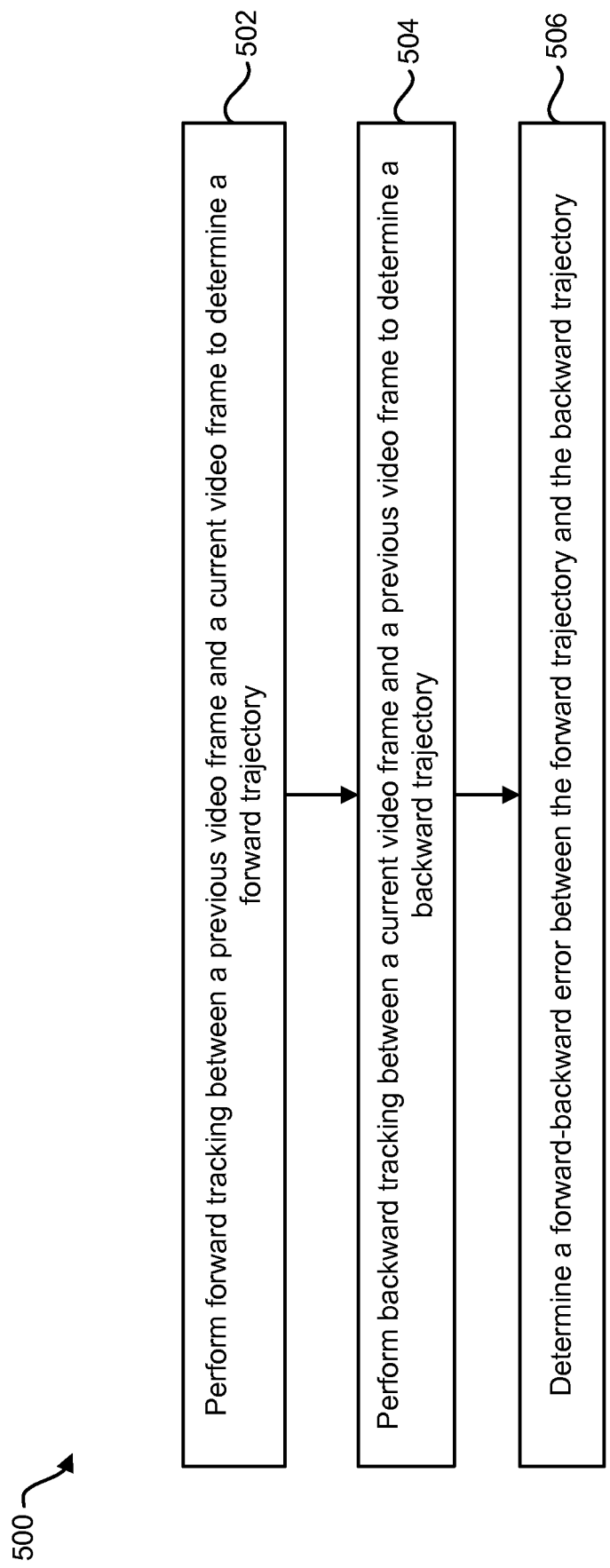
FIG. 5 is a flow diagram illustrating a configuration of a method for estimating a tracking error in motion-based tracking based on forward-backward error.

FIG. 5 is a flow diagram illustrating a configuration of a method 500 for estimating a tracking error in motion-based tracking based on forward-backward error. The method 500 may be implemented by an electronic device 102 (e.g., an object tracking and detection module 104). In some configurations, the electronic device 102 may calculate a NCC between tracked windows, which may be used to determine a tracking confidence value 228. The electronic device 102 may also use various tracking error estimation techniques complementary to NCC (e.g., forward-backward error, sum-of-square difference). In an example using forward-backward error estimation, an electronic device 102 may perform 502 forward tracking between a previous video frame (N−1) 222 and a current video frame (N) 224 to determine a forward trajectory. Forward tracking may include tracking an image forward for k steps. The resulting forward trajectory may be equal to $(x_t, x_{t+1}, \ldots, x_{t+k})$, where $x_t$ is a point location in time and k indicates a length of a sequence of images. The electronic device 102 may perform 504 backward tracking between a current video frame (N) 224 and a previous video frame (N−1) 222 to determine a backward trajectory. The resulting backward trajectory may be equal to $(\hat{x}_t, \hat{x}_{t+1}, \ldots, \hat{x}_{t+k})$, where $\hat{x}_{t+k} = x_{t+k}$.

The electronic device 102 may determine 506 a forward-backward error between the forward trajectory and the backward trajectory. The forward-backward error may be defined as the distance between the forward trajectory and the backward trajectory. Further, various distances may be defined for the trajectory comparison. In one configuration, the Euclidean distance between the initial point and the end point of the validation trajectory may be used when determining the forward-backward error. In one configuration, the forward-backward error may be used as the tracking error, which may be used to determine a tracking confidence value 228.

Figure 6:
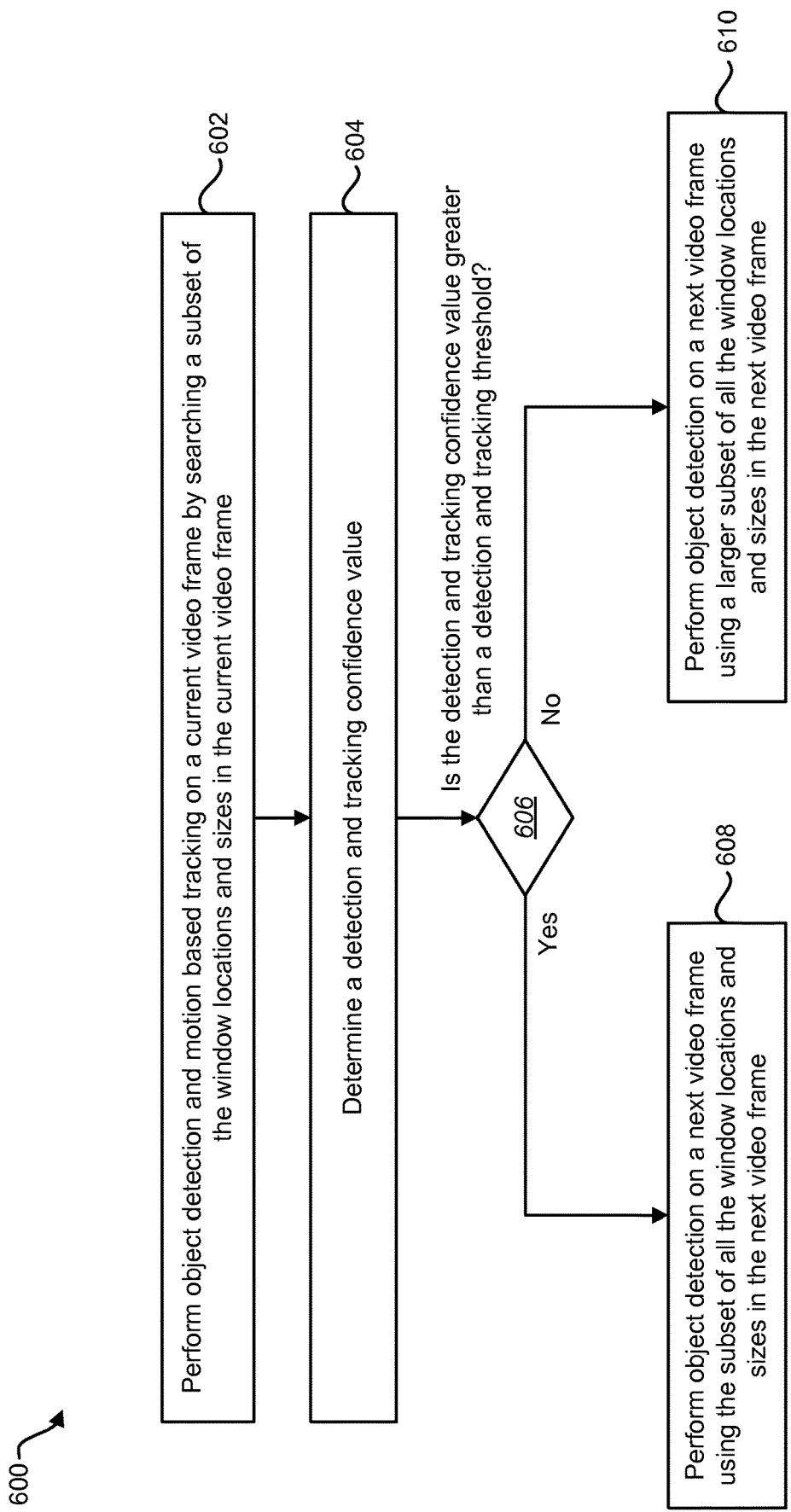
FIG. 6 is a flow diagram illustrating a method for performing object detection and tracking.

FIG. 6 is a flow diagram illustrating a method 600 for performing object detection and tracking. The method 600 may be implemented by an electronic device 102 (e.g., an object tracking and detection module 104). The electronic device 102 may perform 602 object detection and motion-based tracking on a current video frame (N) 224 by searching a subset of the window locations and sizes in the current video frame (N) 224.

The electronic device 102 may determine 604 a detection and tracking confidence value 256. The electronic device 102 may also determine 606 whether the detection and confidence value 256 is greater than a detection and tracking threshold 254. If the detection and confidence value is greater than a detection and tracking threshold 254, the electronic device 102 may perform 608 object detection on a next video frame using the subset (e.g., the same subset) of windows and sizes in the next video frame. If the detection and confidence value 256 is less than a detection and tracking threshold 254, the electronic device 102 may perform 610 object detection on a next video frame using a larger subset of the window locations and sizes in the next video frame.

FIG. 7A is a block diagram illustrating an image window 700 having different window sizes 766a-j that may be used with the present systems and methods. The windows that are searched may be any shape (e.g., square, rectangular, circular, elliptical, user-defined, etc.). Furthermore, any number of window sizes may be available, e.g., 5, 15, 20, 30, etc. A search range may include all or a subset (e.g., those similar to the window location and window size associated with the target object in the recent frame) of window sizes used for a particular location.

Figure 7B:
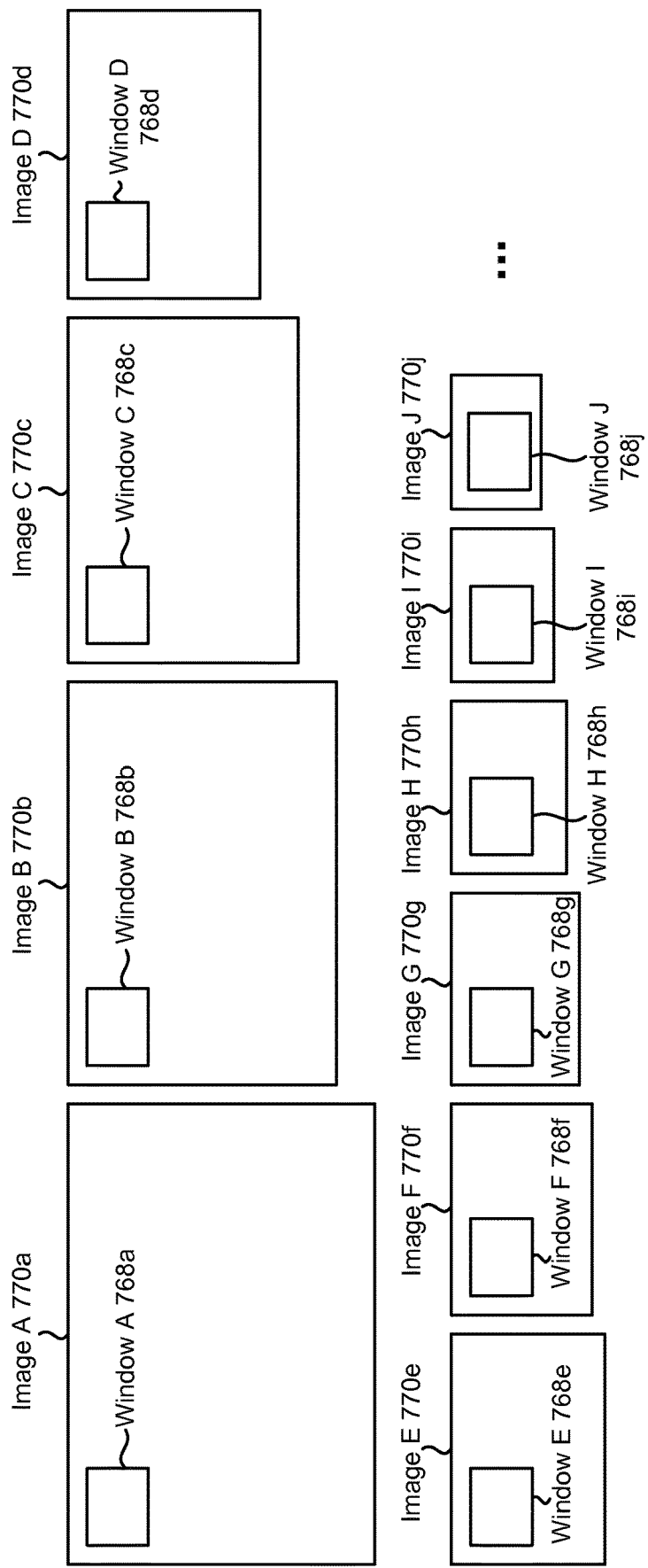
FIG. 7B is a diagram illustrating several example images and windows that may be used with the present systems and methods.

FIG. 7B is a diagram illustrating several example images 770a-j and windows 768a-j that may be used with the present systems and methods. In particular, FIG. 7B illustrates that different image sizes or scales may be searched, while the window size may remain the same. The approach described in connection with FIG. 7B may be implemented in addition to or alternatively from the approach described in connection with FIG. 7A.

Figure 8:
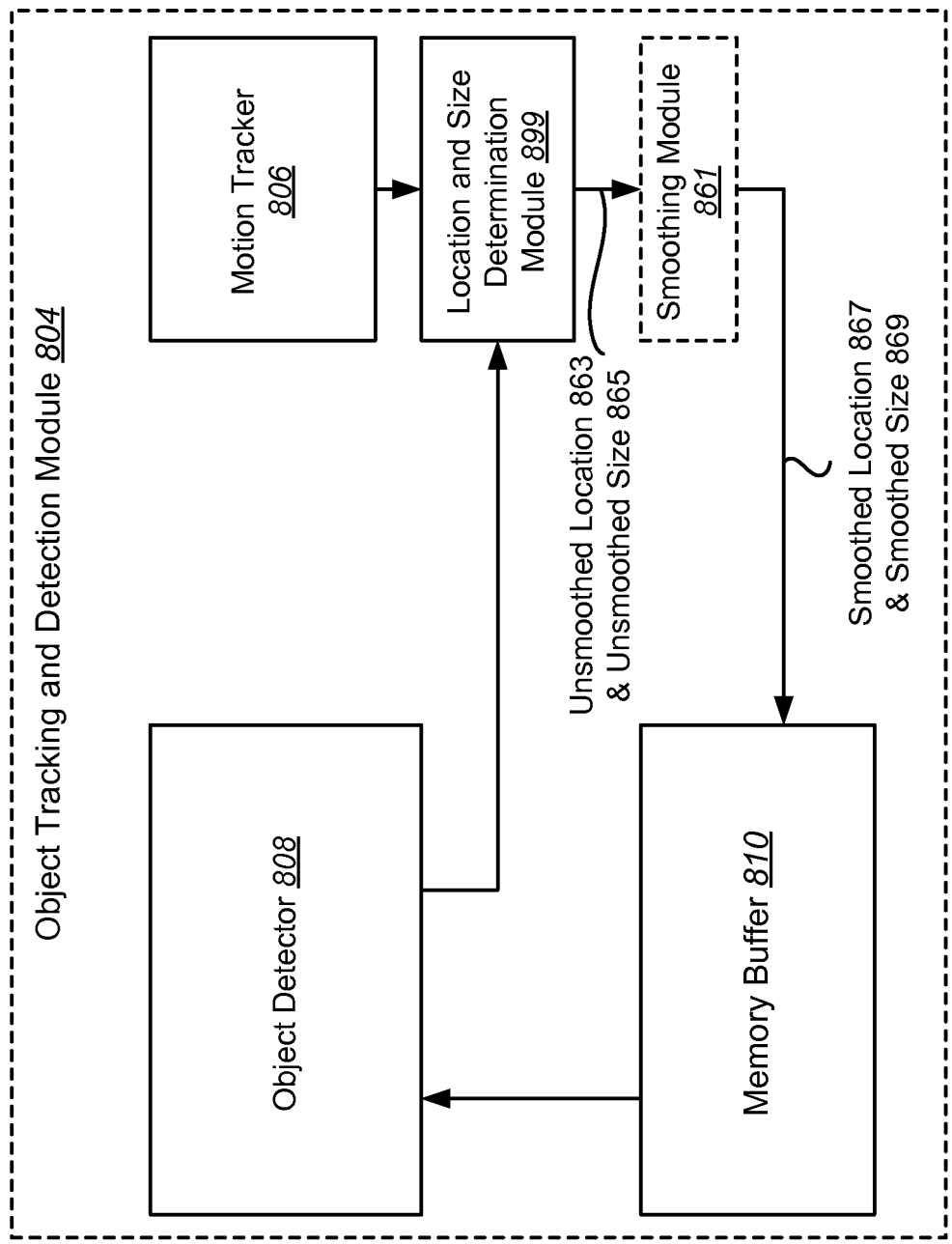
FIG. 8 is a block diagram illustrating another possible configuration of an object tracking and detection module.

FIG. 8 is a block diagram illustrating another possible configuration of an object tracking and detection module 804. The object tracking and detection module 804 illustrated in FIG. 8 may include one or more similar components and perform similar functionality to corresponding components in the object tracking and detection module 204 illustrated in FIG. 2. Specifically, the object tracking and detection module 804 may include an object detector 808, motion tracker 806 and/or a memory buffer 810.

The object tracking and detection module 804 may optionally include a smoothing module 861 that is used to reduce the jittering affect due to target motion and tracking error (causing a search window to have a smoother trajectory in both location (x, y) and size (width, height), for example). The smoothing module 861 can be simple moving average (MA) filters or auto regression (AR) filters. The smoothing degree for the location and size can be different. Predictive filters, such as a Kalman filter may also be suitable for location smoothing. More detail is given in connection with FIG. 9.

The object tracking and detection module 804 may optionally include a location and size determination module 899 that may output the combined result of motion tracking and object detection, which may be represented by a bounding box. This bounding box may include location and/or size information that is/are smoothed by the smoothing module 861. For example, the smoothing module 861 may produce a smoothed location 867 and/or a smoothed size 869 based on an unsmoothed location 863 and an unsmoothed size 865.

Figure 9:
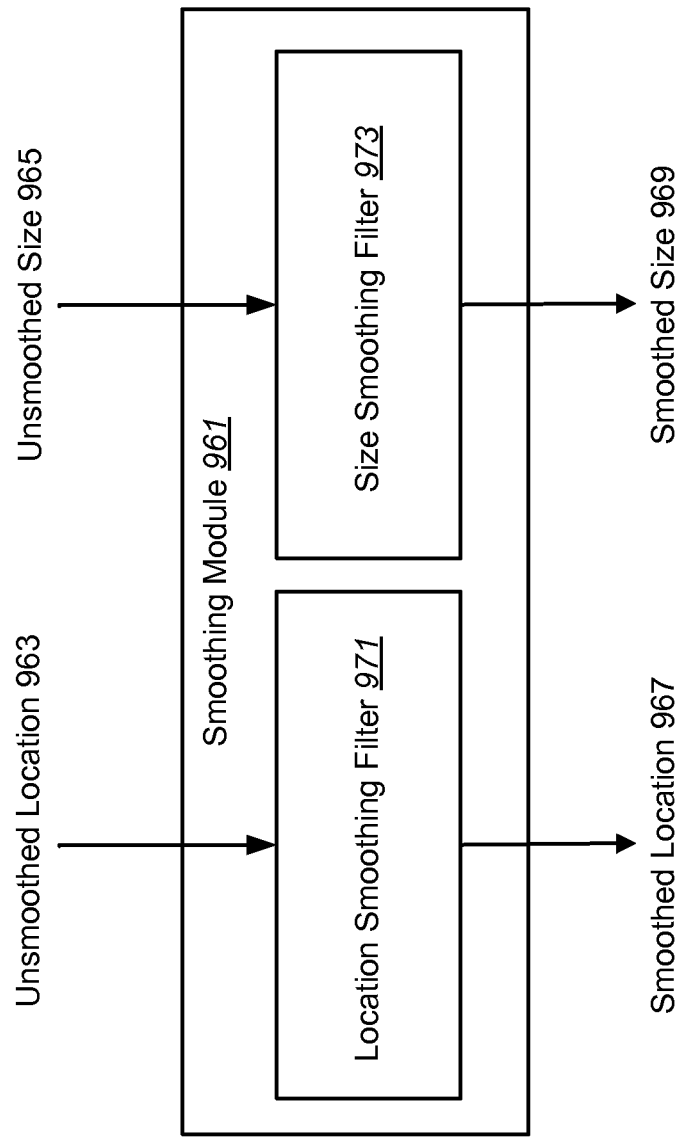
FIG. 9 is a block diagram illustrating a smoothing module.

FIG. 9 is a block diagram illustrating a smoothing module 961. In one configuration, using an auto regression (AR) model, the location smoothing filter 971 and the size smoothing filter 973 may produce a smoothed location 967 and/or a smoothed size 969 based on an unsmoothed location 963 and/or an unsmoothed size 965.

For example, assume X is the variable to be smoothed (either the location or the size) and let X' be the output of X by the object tracker. In this configuration, the smoothed filtering of X at time t, $X_t$, can be described in accordance with $X_t = W*X'_t + (1-W)*X_{t-1}$, where $X'_t$ is the tracker output of X at time t, $X_{t-1}$ is the smoothed result of X at time t−1, and W (0<=W<=1) is a smoothing weight that controls the smoothing effect. For example, $X'_t$ may be a window location or window size selected for a current video frame and $X_{t-1}$ may be a window location or window size used for a previous video frame. A different smoothing weight, W, can be used for the location smoothing filter 971 and the size smoothing filter 973. The selection of smoothing weight may also be adapted based on the detection and tracking confidence value and/or based on a tracking confidence value or a detection confidence value.

Figure 10:
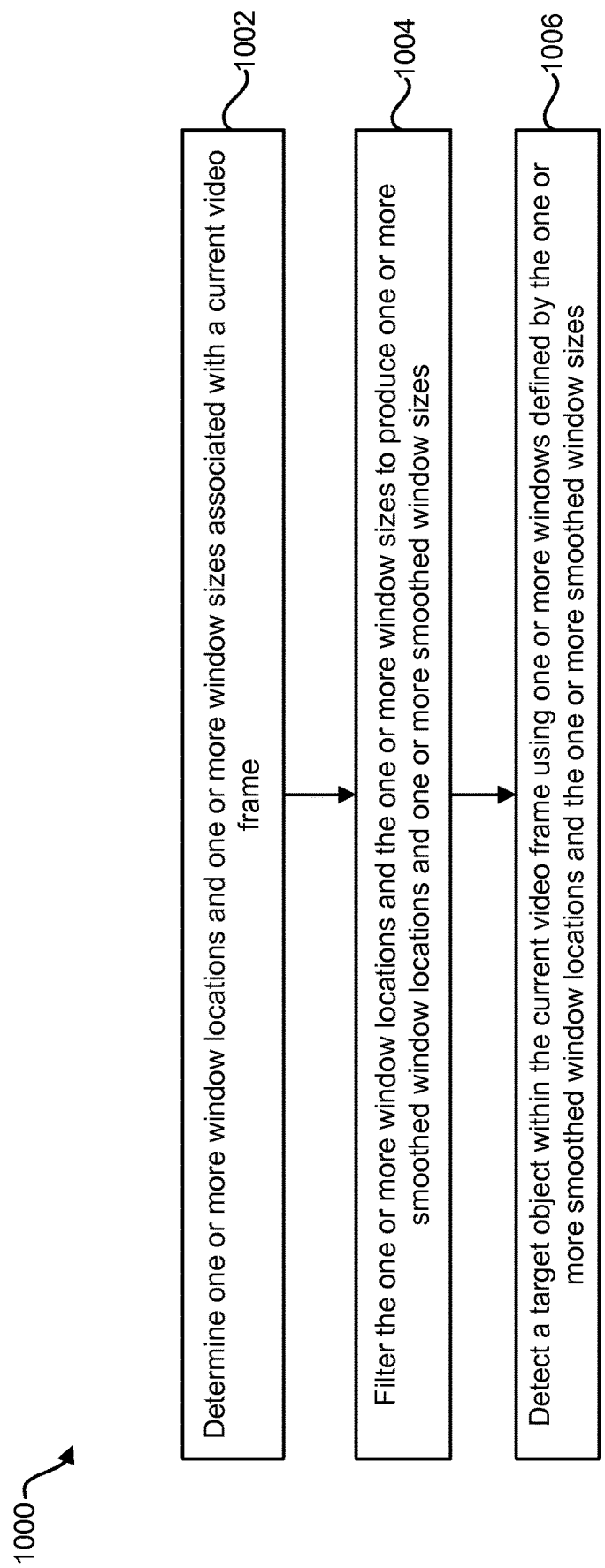
FIG. 10 is a flow diagram illustrating a method for smoothing jitter in motion tracking results.

FIG. 10 is a flow diagram illustrating a method 1000 for smoothing jitter in motion tracking results. The method 1000 may be performed by an electronic device 102, e.g., an object tracking and detection module 804 in an electronic device 102. The electronic device 102 may determine 1002 one or more window locations and one or more window sizes associated with a current video frame, e.g., an unsmoothed location 863 and unsmoothed size 865. The electronic device 102 may also filter 1004 the one or more window locations and the one or more window sizes to produce one or more smoothed window locations 867 and one or more smoothed window sizes 869. For example, this may include using a moving average filter, an auto regression filter or a Kalman filter. In one configuration, in response to low tracking confidence (e.g., the detection and tracking confidence value is below the detection and tracking threshold), the smoothing weights for location and size may be reduced. Alternatively, the smoothing weights may be reduced based on the detection confidence value or the tracking confidence value. The electronic device 102 may also detect 1006 a target object within the current video frame 224 using one or more windows defined by the one or more smoothed window locations 867 and the one or more smoothed sizes 869.

Some configurations of the systems and methods disclosed herein may provide robust object tracking based on local motion patterns and/or global motion patterns. For example, some configurations of the systems and methods disclosed herein may improve tracking quality by using the differences in local and global motion. Motion may provide a cue for object tracking. However, motion from a cluttered background may present a challenge to the object tracker as it may distort motion estimation. Since the object of interest may move in a way that is different from the background, difference in motion between the object and its background may be beneficially utilized. Motion patterns may not only be used by themselves for tracking, but may also augment tracking methods and improve their performance.

In some configurations, the systems and methods disclosed herein may estimate the likelihood of an object's position within a tracking region of interest (ROI) using differences between the local and global motion. Local motion may be the motion of content (e.g., foreground) within a region of interest between frames. For example, local motion may indicate the movement of content in a region of interest from a first frame to a second frame. Global motion may be the motion of content (e.g., all content or the content in general) between frames. Differences between the local and global motion may be measured as a degree of relative motion between the region of interest and the whole image. By separating foreground and background motion, the systems and methods disclosed herein may reduce the chance of the tracker getting distracted by background clutter. Using local motion information may help in maintaining a tighter region of interest (e.g., bounding region, bounding box, etc.) around the object, and may prevent the region of interest from expanding unnecessarily and/or losing track of the object. For example, object tracking may be lost if the region of interest expands too much. By computing weights based on the difference between local motion and global motion, both scale and translation of the object between frames may be estimated concurrently (e.g., simultaneously). Temporal and/or spatial smoothing may be applied to the weights to reduce and/or remove any outliers or noise. Some configurations of the systems and methods disclosed herein may be computationally light, and hence may be performed in real time. Additionally or alternatively, the systems and methods disclosed herein may be performed alongside other tracking methods to facilitate robust tracking.

Figure 11:
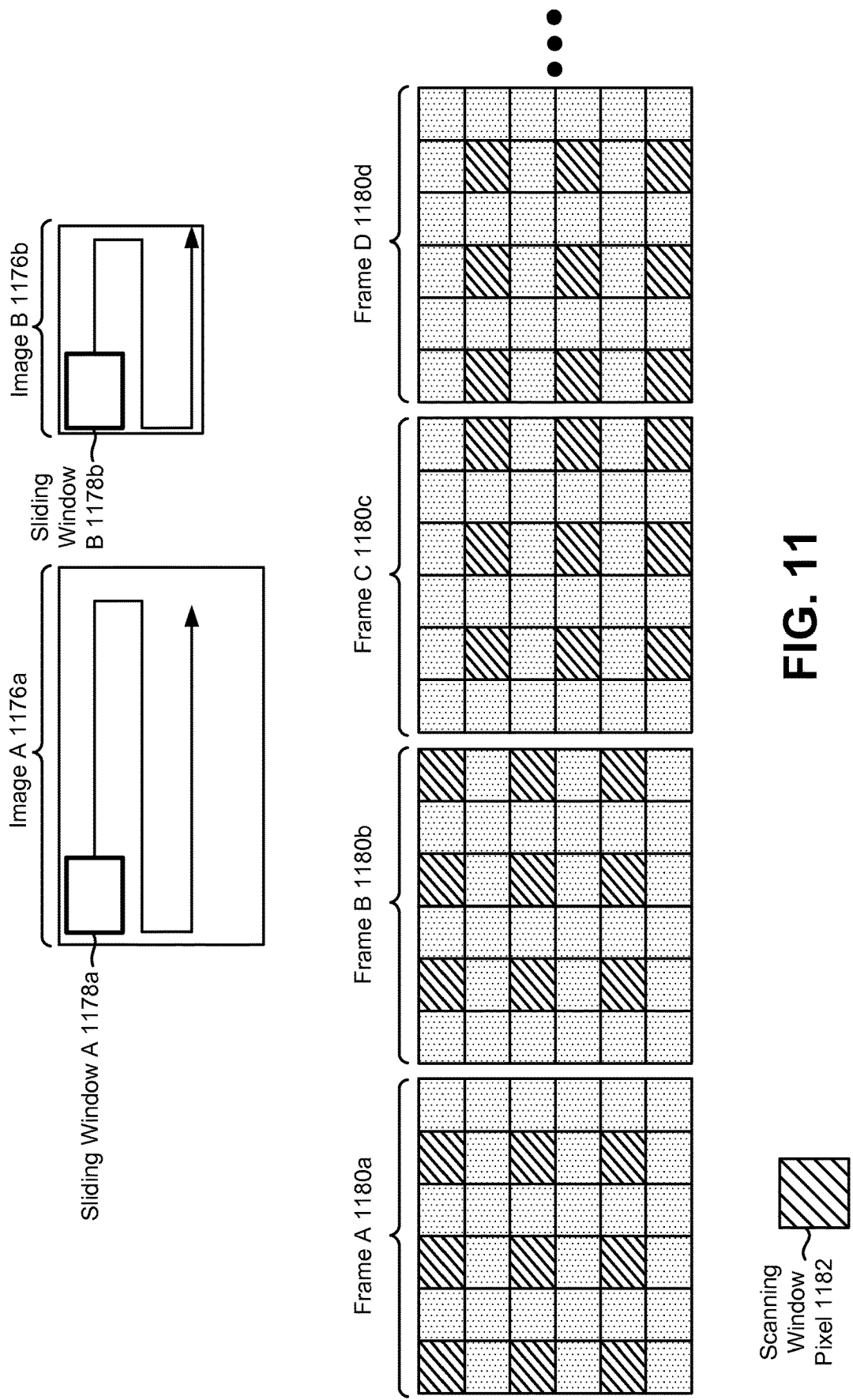
FIG. 11 is a diagram illustrating examples of sliding windows and scanning step windows.

FIG. 11 is a diagram illustrating examples of sliding windows and scanning step windows. Specifically, image A 1176a and image B 1176b are two different image sizes or scales. Sliding window A 1178a is applied in a zig-zag pattern to image A 1176a. Similarly, sliding window B 1178b is applied in a zig-zag pattern to image B 1176b. In some configurations, sliding window A 1178a and sliding window B 1178b may be of the same or substantially the same size (i.e., fixed window size). In other configurations, different window sizes may be utilized. In addition to the zig-zag pattern or alternatively, a scanning window may be applied in a scan-line pattern.

Some configurations of the systems and methods disclosed herein may utilize a scanning step. For example, when scanning all possible locations of an image is too computationally expensive, one approach is to skip image locations in one frame (along a scan path, for example), and then scan the skipped windows in other frames (e.g., subsequent frames). Different scanning patterns may be applied. In the example of frames A-D 1180a-d in FIG. 11, a scanning step of 2 in the width dimension (e.g., x dimension, X-step=2) and a scanning step of 2 in the height dimension (e.g., y dimension, Y-step=2) are illustrated. Each frame 1180a-d may include a group of pixels. For convenience of illustration in FIG. 11, the frames 1180a-d may represent small images (e.g., 6×6 pixel images) or portions of larger images (e.g., a 6×6 pixel section of a larger image).

Specifically, scanning window pixels 1182 are illustrated in each frame A-D 1180a-d. Each scanning window pixel 1182 is an upper-left pixel (e.g., starting location) of each scanning window. For example, frame A 1180a includes 9 scanning window pixels 1182, where each of the scanning window pixels 1182 is an upper-left pixel of a corresponding scanning window. Accordingly, frame A 1180a includes 9 scanning windows. Each scanning window may cover a number of pixels (e.g., 16×16 pixels, 24×24 pixels, etc.). Accordingly, scanning windows may overlap. Specifically, for example, scanning windows overlap unless the scanning step is greater than or equal to the window width.

In the example of frames A-D 1180a-d, a full scan of an image (e.g., all scanning window locations) takes 4 frames. For instance, the scanning windows corresponding to the scanning window pixels 1182 may be scanned at each frame. In particular, pixels within the scanning windows at frame A 1180a (e.g., at a first time or at a first frame) may be scanned. Then, the scanning windows may be shifted, where the pixels of the scanning windows are scanned for a subsequent frame. For example, the pixels included in scanning windows at frame B 1180b may be scanned and so on. In some configurations, each group of windows (e.g., four windows in FIG. 11) may be scanned over frames proceeding in a zig-zag pattern, in a clockwise pattern, in a counter-clockwise pattern or in another order (e.g., upper-left, lower-right, upper-right, lower-left, etc.).

In some configurations, a scanning step may be viewed as a skip size (e.g., a number of windows and/or pixels skipped). For example, a scanning step of two in a first dimension (e.g., width dimension, x dimension, etc.) and a scanning step of two in a second dimension (e.g., height dimension, y dimension, etc.) may lead to the scanning pattern of frames A-D 1180a-d as illustrated in FIG. 11. For example, only one-fourth of the possible scanning windows may be scanned in each frame.

In some configurations, the possible scanning window locations (e.g., start locations) may correspond to fewer than all of the pixels. For example, the possible scanning window locations (e.g., start locations) may correspond to every-other pixel (e.g., every two pixels at pixel indices 0, 2, 4, etc.) or less, such as every three pixels (e.g., at pixel indices 0, 3, 6, etc.). As described above, it should be noted that the scanning step may be viewed as a number of windows skipped. For instance, in a configuration where the possible scanning window locations correspond to every-other pixel (e.g., pixel indices of 0, 2, 4, 6, 8, 10, etc.), a scanning step of 2 may result in starting pixels of the scanning windows at pixel indices 0, 4, 8, etc., for a first frame and 2, 6, 10, etc., for a second frame.

It should be noted that although the scanning techniques of FIG. 11 are described in terms of images or frames, similar scanning techniques may be applied to one or more subsets of an entire image or frame. For example, a sliding window scan and/or a scanning step may be applied to a bounding region within a frame or image.

It should be noted that scanning may be utilized for one or more objectives. For example, scanning may be utilized in object detection and/or in object recognition.

Figure 12:
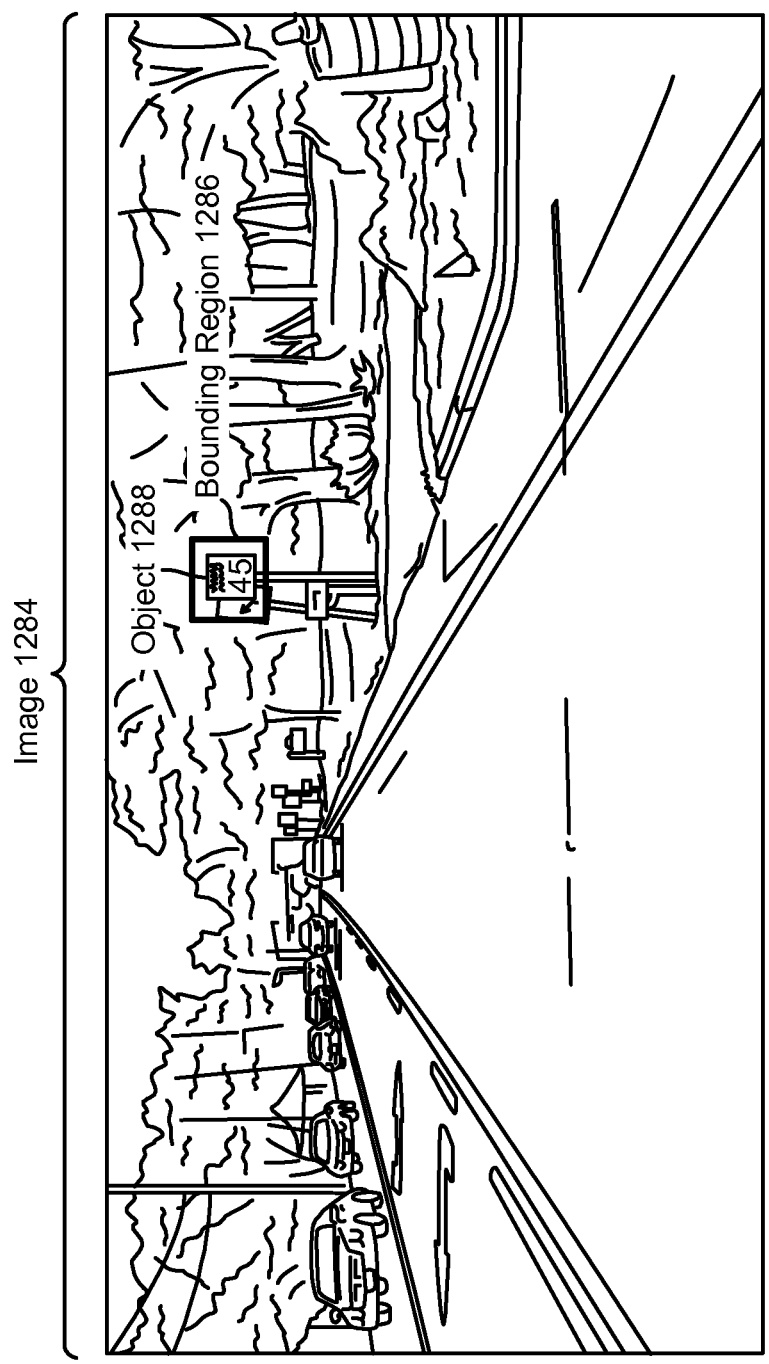
FIG. 12 illustrates an example of an object in an image.

FIG. 12 illustrates an example of an object 1288 in an image 1284. Object tracking may be useful in many applications. For example, object tracking may be useful for object detection in advanced driver assistance systems (ADAS). Object tracking may be utilized to track traffic signs (e.g., speed limit signs, stop signs, street signs, etc.). In the example illustrated in FIG. 12, the object 1288 is a traffic sign (e.g., speed limit sign) that indicates a speed limit of 45 miles per hour (mph). It may be beneficial to track traffic signs (e.g., the speed limit sign) in order to perform one or more operations (e.g., regulating the speed of a vehicle, warning a driver, performing assisted stops, etc.).

However, some problems may occur with object tracking. Optical flow is one example of an efficient object tracker. While some object trackers may be efficient, they can fail (e.g., lose tracking). For each bounding region 1286 (e.g., bounding box), for example, features (e.g., scale-invariant feature transform (SIFT) features, Harris features, features with a particular corner property, etc.) may be selected for tracking in the next frame. In many cases, however, features may originate from the background (e.g., a non-target object), which can damage tracking in one or more subsequent frames. For example, a bounding region 1286 (e.g., bounding box) may not tightly bound the object 1288. In this case, one or more features may be selected from the background, thereby damaging tracking in a subsequent frame.

One approach to improving tracking may include removing background points (e.g., background pixels) from the bounding region 1286 and/or resizing the bounding region 1286 to exclude background points. Accordingly, the features (e.g., updated features) may more likely be based on the target object. This may enable robust tracking (using optical flow, for example). In some configurations of the systems and methods disclosed herein, for instance, one or more predetermined traffic sign models may be utilized to improve optical flow tracking in an ADAS.

In general, a bounding region may be a closed shape that bounds one or more pixels of an image. Bounding regions may be regular or irregular in shape. For instance, a bounding region may be a rectangle, a square, a circle, an ellipse, a trapezoid, a polygon, a closed curve, etc. Bounding regions may differ in size. In some configurations, a bounding region may also be referred to as a region of interest (ROI) or a bounding box (for rectangular bounding regions, for instance). A bounding region may completely contain an object, may partially contain an object or may not contain an object. In some configurations, a bounding region may overlap a portion of an object. In some configurations, a bounding region may be rectangular for any number of different objects (e.g., pedestrian, yield sign, stop sign, etc.), which may have different predetermined object models.

Figure 13:
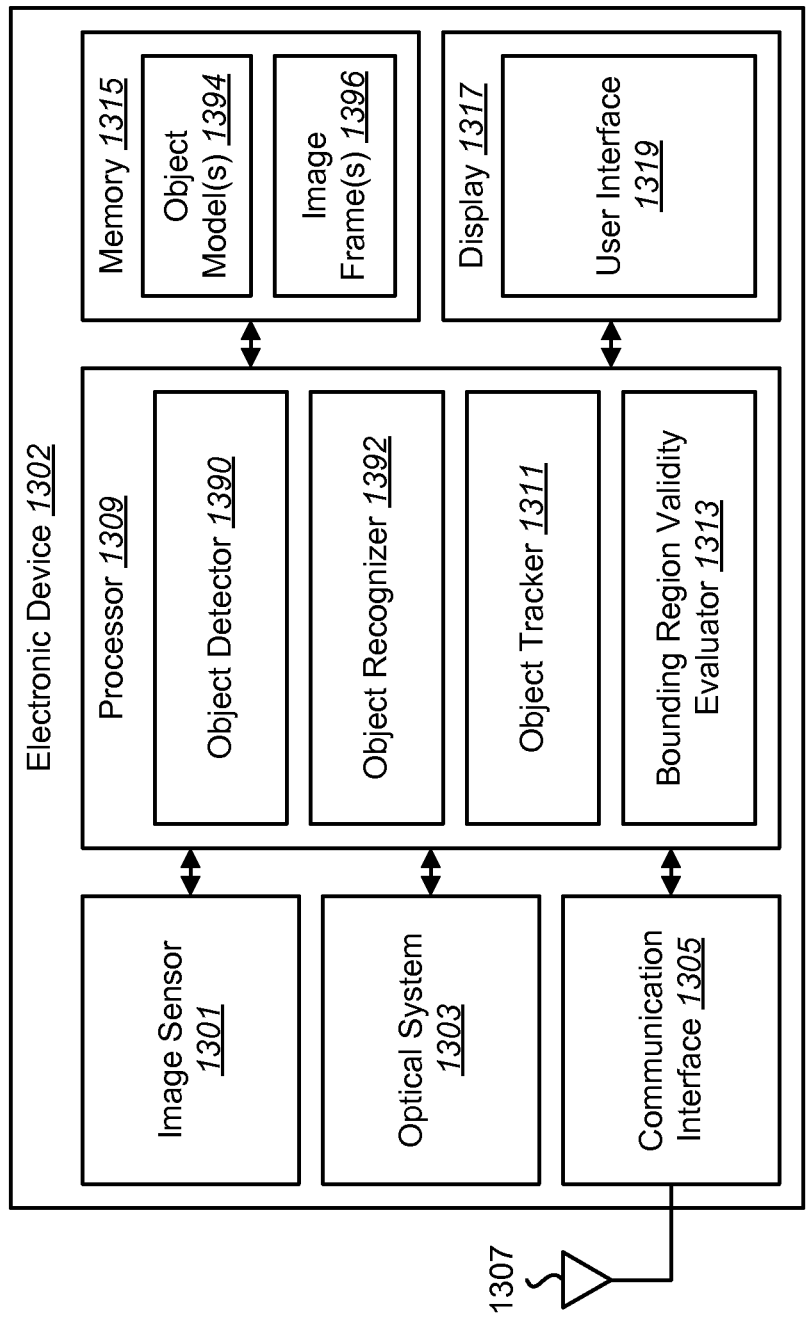
FIG. 13 is a block diagram illustrating one example of an electronic device in which systems and methods for object tracking may be implemented.

FIG. 13 is a block diagram illustrating one example of an electronic device 1302 in which systems and methods for object tracking may be implemented. Examples of the electronic device 1302 include cameras, video camcorders, digital cameras, cellular phones, smart phones, computers (e.g., desktop computers, laptop computers, etc.), tablet devices, media players, televisions, automobiles, personal cameras, action cameras, surveillance cameras, mounted cameras, connected cameras, robots, aircraft, drones, unmanned aerial vehicles (UAVs), healthcare equipment, gaming consoles, personal digital assistants (PDAs), set-top boxes, etc. The electronic device 1302 may include one or more components or elements. One or more of the components or elements may be implemented in hardware (e.g., circuitry) or a combination of hardware and software (e.g., a processor with instructions).

In some configurations, the electronic device 1302 may include a processor 1309, a memory 1315, a display 1317, an image sensor 1301, an optical system 1303, and/or a communication interface 1305. The processor 1309 may be coupled to (e.g., in electronic communication with) the memory 1315, display 1317, image sensor 1301, optical system 1303, and/or communication interface 1305. It should be noted that one or more of the elements illustrated in FIG. 13 may be optional. In particular, the electronic device 1302 may not include one or more of the elements illustrated in FIG. 13 in some configurations. For example, the electronic device 1302 may or may not include an image sensor 1301 and/or optical system 1303. Additionally or alternatively, the electronic device 1302 may or may not include a display 1317. Additionally or alternatively, the electronic device 1302 may or may not include a communication interface 1305.

The communication interface 1305 may enable the electronic device 1302 to communicate with one or more other electronic devices. For example, the communication interface 1305 may provide an interface for wired and/or wireless communications. In some configurations, the communication interface 1305 may be coupled to one or more antennas 1307 for transmitting and/or receiving radio frequency (RF) signals. Additionally or alternatively, the communication interface 1305 may enable one or more kinds of wireline (e.g., Universal Serial Bus (USB), Ethernet, etc.) communication.

In some configurations, multiple communication interfaces 1305 may be implemented and/or utilized. For example, one communication interface 1305 may be a cellular (e.g., 3G, Long Term Evolution (LTE), CDMA, etc.) communication interface 1305, another communication interface 1305 may be an Ethernet interface, another communication interface 1305 may be a universal serial bus (USB) interface, and yet another communication interface 1305 may be a wireless local area network (WLAN) interface (e.g., Institute of Electrical and Electronics Engineers (IEEE) 802.11 interface).

In some configurations, the electronic device 1302 may perform one or more of the functions, procedures, methods, steps, etc., described in connection with one or more of FIGS. 1-12. Additionally or alternatively, the electronic device 1302 may include one or more of the structures described in connection with one or more of FIGS. 1-12. In some configurations, the object tracking described in connection with FIG. 13 may be implemented in conjunction with one or more of the image scanning, object detection and/or object tracking approaches described in connection with one or more of FIGS. 1-12. It should be noted that the object tracking described in connection with FIG. 13 may be implemented in addition to or alternately from one or more of the approaches to image scanning and/or object tracking described in connection with one or more of FIGS. 1-12. For example, the object tracker 1311 described in connection with FIG. 13 may be implemented in one or more of the electronic devices described above in addition to or instead of the tracking described in connection with one or more of the object tracking and detection modules 104, 204, 804.

The electronic device 1302 may obtain one or more images (e.g., digital images, image frames, video, etc.). The one or more images (e.g., frames) may be images of a scene (e.g., one or more objects and/or background). For example, the electronic device 1302 may include the image sensor 1301 and the optical system 1303 (e.g., lenses) that focuses images of objects that are located within the field of view of the optical system 1303 onto the image sensor 1301. In some configurations, the image sensor 1301 may capture the one or more images. The optical system 1303 may be coupled to and/or controlled by the processor 1309. Additionally or alternatively, the electronic device 1302 may request and/or receive the one or more images from another device (e.g., an external image sensor coupled to the electronic device 1302, a network server, traffic camera, drop camera, automobile camera, web camera, etc.). In some configurations, the electronic device 1302 may request and/or receive the one or more images via the communication interface 1305. For example, the electronic device 1302 may or may not include a camera (e.g., an image sensor 1301 and/or optical system 1303) and may receive images from a remote device. One or more image frames 1396 may be stored in the memory 1315. One or more of the image frames 1396 may include an object (e.g., a target object for detection and/or tracking).

The memory 1315 may store instructions and/or data. The processor 1309 may access (e.g., read from and/or write to) the memory 1315. Examples of instructions and/or data that may be stored by the memory 1315 may include image data (e.g., one or more image frames 1396), one or more predetermined object models 1394, features, feature vectors, object detector instructions 1390, object recognizer 1392 instructions, object tracker 1311 instructions, bounding region validity evaluator 1313 instructions and/or instructions for other elements (e.g., object remover, cropper, focuser, image enhancer, compressor, etc.), etc. In some configurations, the electronic device 1302 (e.g., the memory 1315) may include an image data buffer (not shown). The image data buffer may buffer (e.g., store) image data (e.g., image frame(s) 1396) from the image sensor 1301. The buffered image data may be provided to the processor 1309.

A predetermined object model 1394 may be a pre-trained (e.g., offline-trained) object model. In other words, predetermined (e.g., offline-trained) models for one or more objects (e.g., traffic signs such as speed limit signs, stops signs, etc.) may be utilized. Each of the predetermined object models 1394 may represent an object that may be recognized by the object recognizer 1392. For example, the predetermined object models 1394 may include object models for traffic signs, traffic signals (e.g., lights), vehicles, barriers, curb markings, people (e.g., pedestrians), street markings, street signs, lane markers, faces, hands (for gesture detection, for example), text characters, buildings, trees, animals, and/or other objects. The predetermined object models 1394 may improve the accuracy of object tracking (e.g., optical flow tracking during specific object tracking). In some configurations, the predetermined object model(s) 1394 (e.g., offline-trained object model(s)) may include one or more classifiers based on deep learning for object recognition. For example, the predetermined object model(s) 1394 may be trained offline using a deep learning model. It should be noted that in some configurations, the memory 1315 may store a predetermined error model. The predetermined error model may model cases in which no object is recognized.

In some configurations, the predetermined object model(s) 1394 may be utilized to determine whether a bounding region (e.g., bounding box) is valid or invalid. For example, an invalid bounding region may be a bounding region that does not include the object and/or that is too big (relative to the object, for instance). Additionally or alternatively, the predetermined object model(s) 1394 may be utilized to refine a bounding region (e.g., remove points from the background) for updated features utilized in object tracking. For instance, object tracking (e.g., the object tracker 1311 and/or optical flow) may be updated only with features corresponding to the object (and not corresponding to the background, for example) that are determined based on the predetermined object model(s) 1394. More detail is given below.

In some configurations, the electronic device 1302 may include a camera software application and/or a display 1317. When the camera application is running, images of objects that are located within the field of view of the optical system 1303 may be captured by the image sensor 1301. The images that are being captured by the image sensor 1301 may be presented on the display 1317. In some configurations, these images may be displayed in rapid succession at a relatively high frame rate so that, at any given moment in time, the objects that are located within the field of view of the optical system 1303 are presented on the display 1317. The one or more image frames 1396 obtained by the electronic device 1302 may be one or more video frames and/or one or more still images.

The processor 1309 may include and/or implement an object detector 1390, an object recognizer 1392, an object tracker 1311, and/or a bounding region validity evaluator 1313. In some configurations, the processor 1309 may be an example of the processor 264 described in connection with FIG. 2. It should be noted that one or more of the elements illustrated in the electronic device 1302 and/or processor 1309 may be optional. For example, one or more of the elements illustrated in the processor 1309 may or may not be included and/or implemented. Additionally or alternatively, one or more of the elements illustrated in the processor 1309 may be implemented separately from the processor 1309 (e.g., in other circuitry, on another processor, on a separate electronic device, etc.). For example, the object detector 1390 and/or the object recognizer 1392 may not be implemented on the electronic device 1302. In some configurations, the electronic device 1302 may receive object detection information and/or object recognition information from another device.

The processor 1309 may include and/or implement an object detector 1390. In some configurations, the object detector 1390 may be an example of one or more of the object detectors 108, 208, 808 described in connection with one or more of FIGS. 1-2 and 8. The object detector 1390 may detect one or more objects in an image frame 1396. For example, the object detector 1390 may detect one or more objects in an image frame 1396 as described above. For instance, the object detector 1390 may scan all or part of an image frame 1396 to determine whether any objects (e.g., target objects) are present in the image frame 1396. In some configurations, a detector model (e.g., classifier) is trained offline. The object detector 1390 may scan one or more windows over the whole image (or a subset of the image) and compare each region with the detector model. It should be noted that other object detection approaches may be utilized in some configurations. One example of a detection approach is a tree-based detector (e.g., tree-based boost detector). Tree-based detectors may offer greater efficiency in comparison with some other detectors. The object detector 1390 may produce one or more bounding regions (e.g., detected bounding region(s)). For example, the object detector 1390 may produce a bounding region that includes an object (e.g., target object).

In some configurations, the object detector 1390 may operate on an initial image frame 1396. For example, the object detector 1390 may first detect an object in an initial image frame 1396. The object tracker 1311 may operate on one or more image frames 1396 after the initial image frame 1396. In some configurations, the object tracker 1311 may operate on one or more image frames 1396 (after object detection, for example) until tracking fails (e.g., until tracking is lost). The object detector 1390 may operate when tracking fails. In some configurations, the object detector 1390 may operate on an image frame 1396 (e.g., the next image frame 1396) after the image frame 1396 in which the tracking fails. Accordingly, the object detector 1390 and the object tracker 1311 may produce bounding regions only in different frames. In other configurations, the object detector 1390 may operate on the image frame 1396 in which tracking has failed. In these configurations, the object detector 1390 may produce a bounding region in an image frame 1396 in which tracking has failed (in which the bounding region produced by the object tracker 1311 may be replaced by a bounding region produced by the object detector 1390, for example).

The processor 1309 may include and/or implement an object recognizer 1392. The object recognizer 1392 may perform object recognition on a bounding region (e.g., a detected bounding region, a tracked bounding region and/or a refined bounding region). For example, the object recognizer 1392 may compare one or more predetermined object models 1394 to the image content within a bounding region. For instance, the object recognizer 1392 may perform object recognition of one or more objects in the detected bounding region. For example, the object recognizer 1392 may determine whether a detected object is a speed limit sign, stop sign, street sign, traffic light, yield sign, parking sign, pedestrian, etc.

The object recognizer 1392 may obtain a predetermined object model 1394 corresponding to the object. When performing object recognition in the detected bounding region, the object recognizer 1392 may attempt to match one of a plurality of predetermined object models 1394 to the object in the detected bounding region. For example, an object in a bounding region may be compared to a database of predetermined object models 1394. If the object in the bounding region matches a predetermined object model 1394 in the database, the object is recognized. Object recognition may be performed for one or more kinds of objects (e.g., eyes, buildings, street signs, people, roads, text, etc.). If at least one of the plurality of predetermined object models 1394 matches the object (with at least a recognition confidence level, for example), then the object may be recognized (e.g., deemed recognized). In a case that the object is not recognized in the detected bounding region, the object detector 1390 may perform object detection in a later (e.g., next) frame.

In a case that an object is recognized in the detected bounding region, the object recognizer 1392 may obtain the predetermined object model 1394 corresponding to the object. For example, the object recognizer 1392 may select the predetermined object model 1394 (with a highest recognition confidence level, for example) from the plurality of predetermined object models 1394.

The object recognizer 1392 may check the object recognition based on the predetermined object model 1394. For example, the object recognizer 1392 may perform object recognition on the image content of a tracked bounding region to determine whether the image content is recognized based on the predetermined object model 1394. For instance, the object recognizer 1392 may verify whether the image content is still recognized as the same kind of object (corresponding to the selected predetermined object model 1394) from an earlier frame. The predetermined object model 1394 may be utilized to determine whether one or more tracked bounding regions (in one or more subsequent frames, for example) are valid. It should be noted that a "tracked bounding region" may be a bounding region that is produced by object tracking (e.g., object tracker 1311). Furthermore, a "detected bounding region" may be a bounding region that is produced by object detection (e.g., object detector 1390).

The processor 1309 may include and/or implement an object tracker 1311. In some configurations, the object tracker 1311 may be an example of one or more of the motion trackers 106, 206, 806 described herein. One or more of the image frames 1396 may be provided to the object tracker 1311. The object tracker 1311 may track one or more objects in one or more image frames 1396. One example of the object tracker 1311 is optical flow.

In some configurations, the object tracker 1311 may perform object tracking based on a bounding region of a current frame (of the image frames 1396). For example, the object tracker 1311 may attempt to track image content (e.g., an object) from frame-to-frame. The object tracking may provide an estimated location of the image content in the subsequent frame. The object tracker 1311 may determine a bounding region (e.g., a tracked bounding region) of a subsequent frame (of the image frames 1396) based on the object tracking. For example, the object tracker 1311 may generate a bounding region of the subsequent frame that corresponds to the tracked image content. In some configurations, the object tracker 1311 may utilize one or more features (e.g., feature vectors) extracted from the current frame bounding region to determine a corresponding subsequent frame bounding region. For example, the object tracker 1311 may extract one or more features based on a bounding region (e.g., a detected bounding region, a tracked bounding region, a refined bounding region, etc.). The object tracking (e.g., the object tracker 1311) may be updated based on the one or more features. It should be noted that the object tracker 1311 may perform object tracking based on a detected bounding region (e.g., a bounding region produced by the object detector 1390), a tracked bounding region (e.g., a bounding region produced by the object tracker 1311) and/or a refined bounding region.

The processor 1309 may include and/or implement a bounding region validity evaluator 1313. The bounding region validity evaluator 1313 may determine whether a bounding region (e.g., a tracked bounding region) is valid based on a predetermined object model 1394. In some configurations, a bounding region may be considered valid if the predetermined object model 1394 matches the image content within the bounding region (with at least a degree of probability, for example). In general, an invalid bounding region may be a bounding region that does not include the object, that is too large to tightly bound an object and/or that does not include enough of an object. In some configurations, a valid bounding region may be a bounding region that at least partially includes (e.g., includes a minimum amount of) the object and that tightly bounds the object. For example, a valid bounding region may meet one or more validity criteria. One example of validity criteria may be whether the object recognizer 1392 recognizes the object with the predetermined object model 1394 within the bounding region. For instance, a predetermined object model 1394 may be selected from a plurality of predetermined object models 1394 when object recognition is performed on a detected bounding region. If the same object is recognized in a tracked bounding region based on the (selected) predetermined object model 1394, the tracked bounding region may be valid.

In some configurations, successful object recognition may be based on a recognition confidence level. For example, an object may be considered successfully recognized within the bounding box if an object is recognized with at least a particular confidence level (e.g., confidence level threshold).

Additionally or alternatively, bounding region validity may be based on one or more ranges (e.g., limited ranges) of scaling, translation and/or rotation. For example, a bounding region may be considered valid if the object is recognized (with a particular confidence level, for instance) within a limited amount of scaling, translation, and/or rotation relative to the bounding region. For instance, a bounding region may be considered valid if the object is successfully recognized in the bounding region within a range of scales (e.g., sizes) relative to the bounding region, within a range of translation within the bounding region, and/or within a range of rotation relative to the bounding region. Other examples of validity criteria may include a proportion of pixels corresponding to the recognized object (e.g., foreground pixels) to pixels that do not correspond to the object (e.g., background pixels), object dimensions relative to bounding region dimensions (e.g., if one or more object dimensions are within a range or proportion of the bounding region dimension(s)), distance between the edge(s) of the object and the bounding region, etc.

In some configurations, a predetermined classifier may be utilized to determine whether the bounding region is valid. For example, one or more of the predetermined object models 1394 may include a predetermined classifier. The predetermined classifier may be a decision boundary that separates feature vectors corresponding to the object from feature vectors that do not correspond to the object.

In a case that the bounding region is valid, the object tracker 1311 may track the object for a later frame (e.g., the next frame) based on the bounding region. For example, the object tracker 1311 may extract one or more features based on the bounding region. The object tracking (e.g., the object tracker 1311) may be updated based on the one or more features. Then, the object tracker 1311 may track the object in a later frame based on the one or more features.

In a case that the bounding region is invalid, the bounding region validity evaluator 1313 may optionally refine the bounding region (e.g., the tracked bounding region) or the object detector 1390 may optionally perform object detection (in the current frame or in a subsequent frame, for example). For example, if the bounding region is too big (e.g., the bounding region is invalid but the object is recognized within the bounding region), the bounding region validity evaluator 1313 may refine the bounding region. For instance, the object recognizer 1392 may scan the bounding region to determine whether the object is within the bounding region. The bounding region may be refined if the object is within the bounding region and the bounding region is invalid (e.g., too large to tightly bound the object). Refining the bounding region may include resizing the bounding region (to more tightly bound the object) to exclude one or more non-object pixels (e.g., background pixels) and/or removing one or more non-object pixels (e.g., background pixels) from the bounding region. In a case that the bounding region is refined, the object tracker 1311 may track the object based on the refined bounding region (e.g., may produce a bounding region for a subsequent frame based on the refined bounding region). In a case that the bounding region is invalid and the object is not recognized within the bounding region (e.g., not recognized to at least a particular confidence level threshold), the object detector 1390 may perform object detection (in a subsequent frame or in a current frame in accordance with the configuration, for example).

In some configurations, electronic device 1302 may perform assisted driving based on the object. For example, the processor 1309 may include (e.g., implement) or may communicate with an advanced driver assistance system (ADAS). For instance, the electronic device 1302 (e.g., ADAS) may perform assisted driving based on the object. The electronic device 1302 may perform one or more operations based on the object (e.g., the detected, recognized and/or tracked object). Examples of operations may include displaying an indicator (e.g., a speed limit, a stop sign, a pedestrian warning, a potential collision warning, a lane departure warning, a street name, an address, etc.), outputting a sound (e.g., a chime, an alarm, speech, honking a vehicle horn, etc.), controlling vehicle speed (e.g., driving at the posted speed limit, braking to avoid a collision, etc.), controlling vehicle steering (e.g., turning to avoid a collision, parallel parking, etc.), controlling vehicle climate (e.g., controlling a defroster or defogger, etc.), and controlling vehicle lights (e.g., turning on fog lights, activating emergency flashers, controlling turn signals, etc.). It should be noted that the electronic device 1302 may be separate from or may be integrated into an automobile in some configurations.

In some configurations, the processor 1309 may include and/or implement one or more other elements. For example, the processor 1309 may include an object remover, an image enhancer, a cropper, a compressor, a focuser, etc. In some configurations, the object remover may remove an object from an image based on the object tracking. For example, the object remover may remove an object included in a bounding region by filling in the object area with image patches from areas outside of the bounding region.

In some configurations, the image enhancer may enhance the quality and/or properties of the image based on the object tracking. For example, the image enhancer may perform color correction, color adjustment, white balance, contrast enhancement, de-hazing, red eye removal, sharpness adjustment, noise reduction, lens correction, filtering, image merging, object highlighting and/or image distortion (e.g., warping). Enhancing the image may include modifying pixels inside of and/or outside of the subset of the bounding region(s).

In some configurations, the cropper may crop the image based on the object tracking. For example, the cropper may crop pixels outside of the bounding region(s) or pixels outside of the bounding region(s) with a margin.

In some configurations, the compressor may compress the image based on the object tracking. For example, the compressor may compress pixels outside of the bounding region(s) or pixels outside of the bounding region(s) with a margin. This may allow for maintaining image fidelity in one or more areas (e.g., regions of interest) that include objects of interest while allowing the remainder of the image to be compressed to reduce the data size of the image.

In some configurations, the focuser may focus the optical system 1303 based on the object tracking. For example, the focuser may utilize the image within one or more regions of interest as a reference to focus the optical system 1303. This may allow one or more objects within the one or more bounding regions to be in focus.

In some configurations, the electronic device 1302 may present a user interface 1319 on the display 1317. For example, the user interface 1319 may enable a user to interact with the electronic device 1302. In some configurations, the display 1317 may be a touchscreen that receives input from physical touch (by a finger, stylus or other tool, for example). Additionally or alternatively, the electronic device 1302 may include or be coupled to another input interface. For example, the electronic device 1302 may include a camera facing a user and may detect user gestures (e.g., hand gestures, arm gestures, eye tracking, eyelid blink, etc.). In another example, the electronic device 1302 may be coupled to a mouse and may detect a mouse click.

It should be noted that no user input may be necessary in some configurations. For example, the electronic device 1302 may automatically detect and/or track one or more objects in the one or more image frames 1396.

Figure 14:
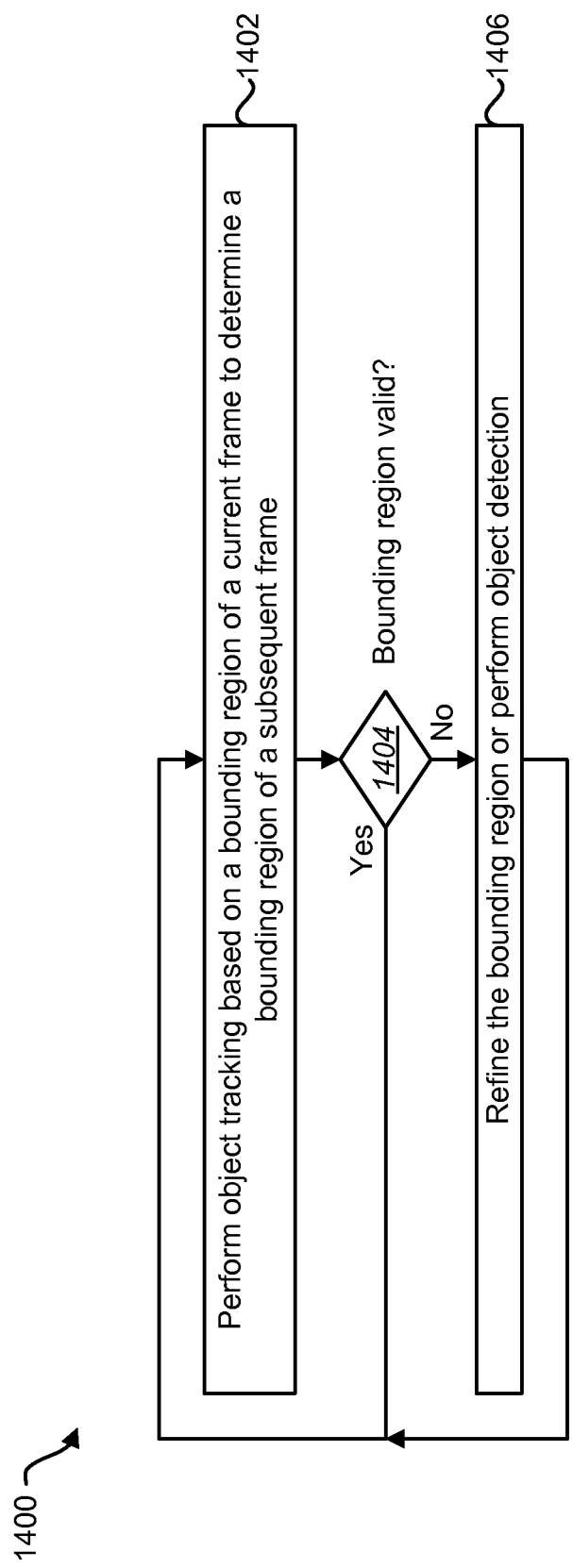
FIG. 14 is a flow diagram illustrating one configuration of a method for object tracking.

FIG. 14 is a flow diagram illustrating one configuration of a method 1400 for object tracking. The method 1400 may be performed by one or more of the electronic devices 102, 1302 described herein, for example. As described above, the electronic device 1302 may obtain one or more images (e.g., one or more frames) of a scene.

The electronic device 1302 may perform 1402 object tracking based on a bounding region of a current frame. For example, the electronic device 1302 may track one or more objects in the image content of the bounding region. The electronic device 1302 may determine a bounding region of a subsequent frame based on the object tracking. This may be accomplished as described in connection with one or more of FIGS. 1-13, for example. It should be noted that a "subsequent" frame may be any frame that is later than the current frame. For example, a subsequent frame may be the next frame in a series of frames or may be a frame later than the next frame.

The electronic device 1302 may determine 1404 whether a bounding region (e.g., the bounding region of the subsequent frame) is valid. This may be accomplished as described in connection with FIG. 13, for example. For instance, the electronic device 1302 may determine whether the object is included in the bounding region (e.g., check object recognition within the bounding region) and/or determine whether the bounding region tightly bounds the object.

If the bounding region is valid, the electronic device 1302 may return to perform 1402 object tracking for a later frame (e.g., for the next frame). For example, the electronic device 1302 may update the object tracking (e.g., object tracker 1311) with features based on the bounding region and track the object for a later frame.

If the bounding region is invalid, the electronic device 1302 may refine 1406 the bounding region or perform object detection. This may be accomplished as described in connection with FIG. 13. For example, if the object is recognized within the bounding region but the bounding region does not tightly bound the object (e.g., the bounding region is too large), the electronic device 1302 may refine 1406 the bounding region. For example, the electronic device 1302 may resize the bounding region in order to exclude one or more non-object (e.g., background) pixels and/or may remove one or more non-object pixels. The electronic device 1302 may then return to perform 1402 object tracking based on the refined bounding region to determine a bounding region of a later frame.

If the object is not recognized within the bounding region, the electronic device 1302 may perform object detection. For example, the electronic device 1302 may proceed to perform object detection on a later frame.

Figure 15:
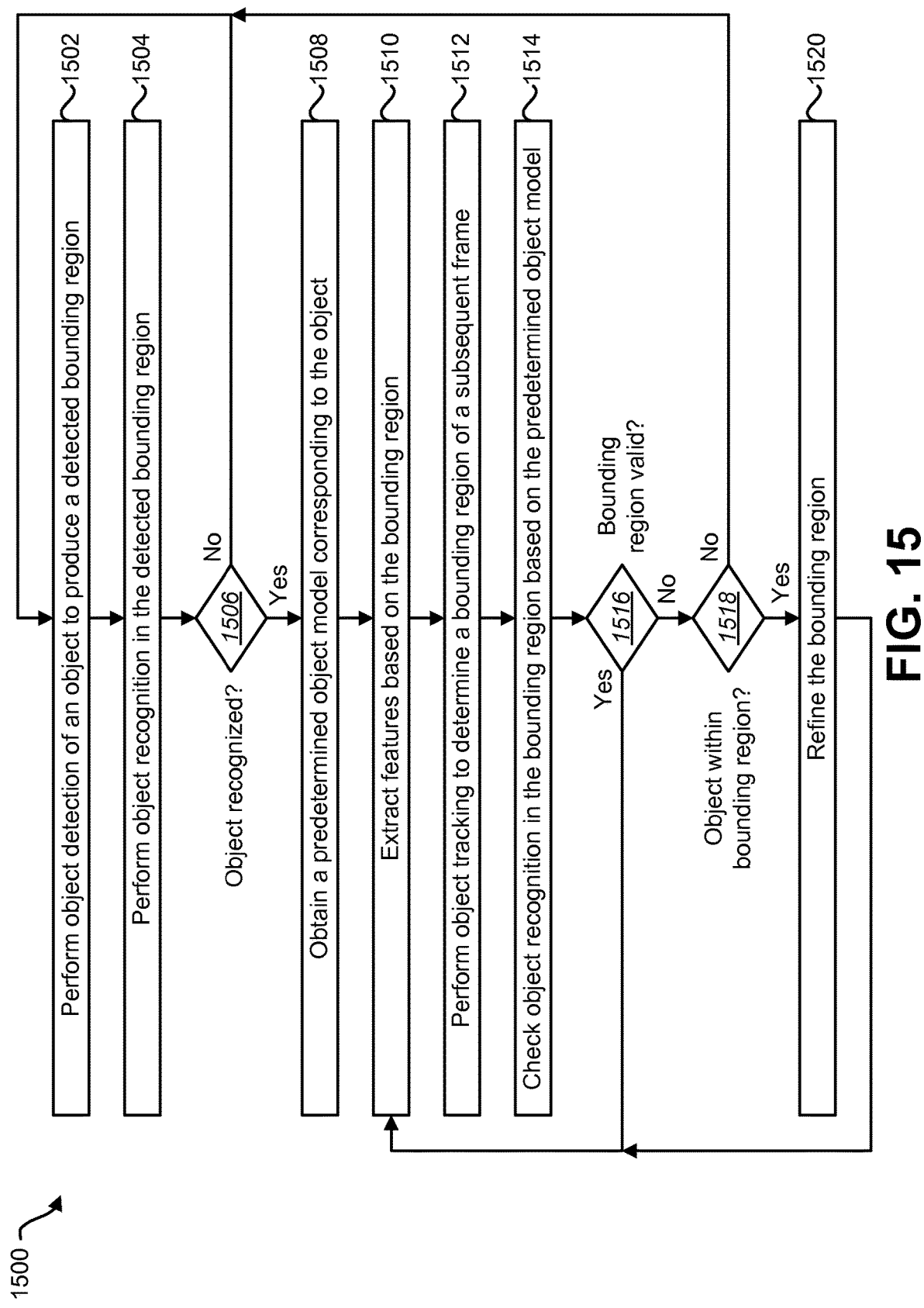
FIG. 15 is a flow diagram illustrating an example of a more specific configuration of a method for object tracking.

FIG. 15 is a flow diagram illustrating an example of a more specific configuration of a method 1500 for object tracking. The method 1500 may be performed by one or more of the electronic devices 102, 1302 described herein, for example.

The electronic device 1302 may perform 1502 object detection of one or more objects to produce a detected bounding region. This may be accomplished as described in connection with one or more of FIGS. 1-4, 6-8, 10-11 and 13-14. For example, the electronic device 1302 may perform object detection in a current frame. Performing object detection may produce a bounding region if an object is detected.

The electronic device 1302 may perform 1504 object recognition (of one or more objects, for example) in the detected bounding region. This may be accomplished as described in connection with one or more of FIGS. 1, 11 and 13-14. For example, the electronic device 1302 may compare the detected bounding region with one or more predetermined object models 1394.

The electronic device 1302 may determine 1506 whether the one or more objects are recognized. This may be accomplished as described above in connection with FIG. 13. For example, the electronic device 1302 may determine whether image content within the detected bounding region matches at least one of the one or more predetermined object models 1394. For instance, the electronic device 1302 may determine whether the image content within the detected bounding region matches a predetermined object model 1394 with a particular recognition confidence level (e.g., to at least a recognition confidence level threshold). If the object is not recognized, the electronic device 1302 may return to detect 1502 an object for a later (e.g., next) frame.

If the object is recognized, the electronic device 1302 may obtain 1508 one or more predetermined object models 1394 corresponding to the one or more objects (e.g., to the recognized object). For example, the electronic device 1302 may select the predetermined object model 1394 (from a plurality of predetermined object models 1394, for instance) that matched the object in object recognition. In some configurations, the electronic device 1302 may select the predetermined object model 1394 with the highest recognition confidence level.

The electronic device 1302 may extract 1510 one or more features based on the bounding region. This may be accomplished as described in connection with one or more of FIGS. 12-13. For example, the electronic device 1302 may extract 1510 one or more features from the image content within the bounding region. For instance, the electronic device 1302 may determine one or more features (e.g., SIFT features, Harris features, corner features, feature vectors, etc.) from the image content within the bounding region of the current frame.

The electronic device 1302 may perform 1512 object tracking based on the bounding region. For example, the electronic device 1302 may perform 1512 object tracking of one or more objects in the bounding region. The electronic device 1302 may determine a bounding region of a subsequent frame based on the object tracking. This may be accomplished as described in connection with one or more of FIGS. 1-14. For example, the electronic device 1302 may perform 1512 object tracking (e.g., optical flow tracking) based on the bounding region (e.g., the image content within the bounding region) of the current frame to determine a bounding region of a subsequent frame. In some configurations, the object tracking (e.g., the object tracker 1311) may be updated with the extracted features in order to perform 1512 object tracking.

It should be noted that the bounding region used to perform 1512 object tracking may be an original bounding region or a refined bounding region. For example, the bounding region may be the original bounding region in a case that the bounding region is produced from object detection 1502 or in a case that the bounding region is produced from object tracking 1512 (from a previous frame) and is determined 1516 to be valid. In another example, the bounding region may be a refined bounding region in a case that the bounding region is produced from object tracking 1512 (from a previous frame) and the bounding region is determined 1516 to be invalid but is determined 1518 to contain the object.

The electronic device 1302 may check 1514 object recognition in the bounding region based on the predetermined object model(s) 1394. This may be accomplished as described in connection with FIG. 13. For example, the electronic device 1302 may check 1514 object recognition in the bounding region of the subsequent frame based on the predetermined object model 1394. Checking 1514 object recognition may include recognizing the object based on the predetermined object model 1394. For example, the electronic device 1302 may attempt to recognize the object corresponding to the predetermined object model 1394 in the bounding region of the subsequent frame. Checking 1514 the object recognition may produce a probability or confidence level that the object is recognized.

It should be noted that in some configurations, checking 1514 object recognition in the bounding region (e.g., tracked bounding region) of the subsequent frame may be accomplished differently than performing 1504 object recognition in a detected bounding region. For example, performing 1504 object recognition in a detected bounding region may include attempting to recognize an object from a plurality of predetermined object models 1394. For instance, performing 1504 object recognition in a detected bounding region may include comparing multiple predetermined object models 1394 to a detected object in order to identify the object (e.g., determine the type of the object). Specifically, performing 1504 object recognition may indicate which of a plurality of predetermined object models 1394 (if any) match the detected object. In some configurations, checking 1514 object recognition in the bounding region (of a subsequent frame) based on the predetermined object model 1394 may compare only one predetermined object model 1394 to the tracked bounding region (e.g., image content within the tracked bounding region). Accordingly, checking 1514 object recognition in the tracked bounding region may indicate whether the obtained 1508 predetermined object model 1394 matches the tracked bounding region (e.g., image content within the tracked bounding region), whereas performing 1504 object recognition in the detected bounding region may indicate which of a plurality of predetermined object models 1394 matches the detected bounding region (e.g., image content within the detected bounding region), for example. Checking 1514 object recognition (e.g., object recognition using only a single predetermined object model 1394) may be more efficient than object recognition with a plurality of predetermined object models 1394, for example.

In other configurations, checking 1514 object recognition in the tracked bounding region of the subsequent frame may be accomplished similarly to performing 1504 object recognition in a detected bounding region. For example, if checking 1514 object recognition in the tracking bounding region yields the same object recognition result (e.g., the same matching predetermined object model 1394) as performing 1504 object recognition in the detected bounding region, then the tracked bounding region may be deemed valid.

The electronic device 1302 may determine 1516 whether a bounding region (e.g., the bounding region of the subsequent frame) is valid. This may be accomplished as described in connection with one or more of FIGS. 13-14, for example. For instance, the electronic device 1302 may determine whether the object is included in the bounding region and whether the bounding region tightly bounds the object. In some configurations, the bounding region may be valid if checking 1514 object recognition in the bounding region (e.g., the tracked bounding region) of the subsequent frame is successful (within one or more ranges of scaling, translation and/or rotation). For example, if checking 1514 object recognition is successful at approximately the scale, location and/or rotation of the bounding region (e.g., tracked bounding region), the bounding region may be valid. If the bounding region is valid, the electronic device 1302 may return to extract 1510 object tracking for a later frame (e.g., for the next frame based on the tracked bounding region).

If the bounding region is invalid, the electronic device 1302 may determine 1518 whether the one or more objects are within the bounding region (e.g., the tracked bounding region of the subsequent frame). This may be accomplished as described above in connection with one or more of FIGS. 13-14. For example, the electronic device 1302 may scan the tracked bounding region in an attempt to recognize the object at different scales, translations and/or rotations within the bounding region. In some configurations, the object may be within the bounding region if the object is successfully recognized (within ranges of scale, translation and/or rotation, one or more of which may allow greater variation than the one or more ranges for determining 1516 bounding region validity).

One or more objects may not be within the bounding region if the object(s) are not successfully recognized. If one or more of the objects are not within the bounding region, the electronic device 1302 may return to detecting 1502 an object in a later frame.

If the one or more objects are within the bounding region, the electronic device 1302 may optionally refine 1520 the bounding region. This may be accomplished as described in connection with one or more of FIGS. 13-14. For example, if the object is recognized within the bounding region but the bounding region does not tightly bound the object (e.g., the bounding region is too large), the electronic device 1302 may refine 1520 the bounding region. For example, the electronic device 1302 may resize the bounding region in order to exclude one or more non-object (e.g., background) pixels and/or may remove one or more non-object pixels. The electronic device 1302 may then return to extracting 1510 features based on the refined bounding region to determine a bounding region of a later frame.

A bounding region that includes the object and that tightly bounds the object (as may be the case where the bounding region is a detected bounding region, is a valid bounding region or is a refined bounding region, for example) may provide features corresponding to the object. This may avoid extracting features corresponding to non-target objects or background, for example. In turn, the corresponding object features may improve tracker performance. For instance, the extracted 1510 features may better represent the target object to improve object tracking performance (e.g., to avoid loss of the object during tracking in subsequent frames).

Figure 16:
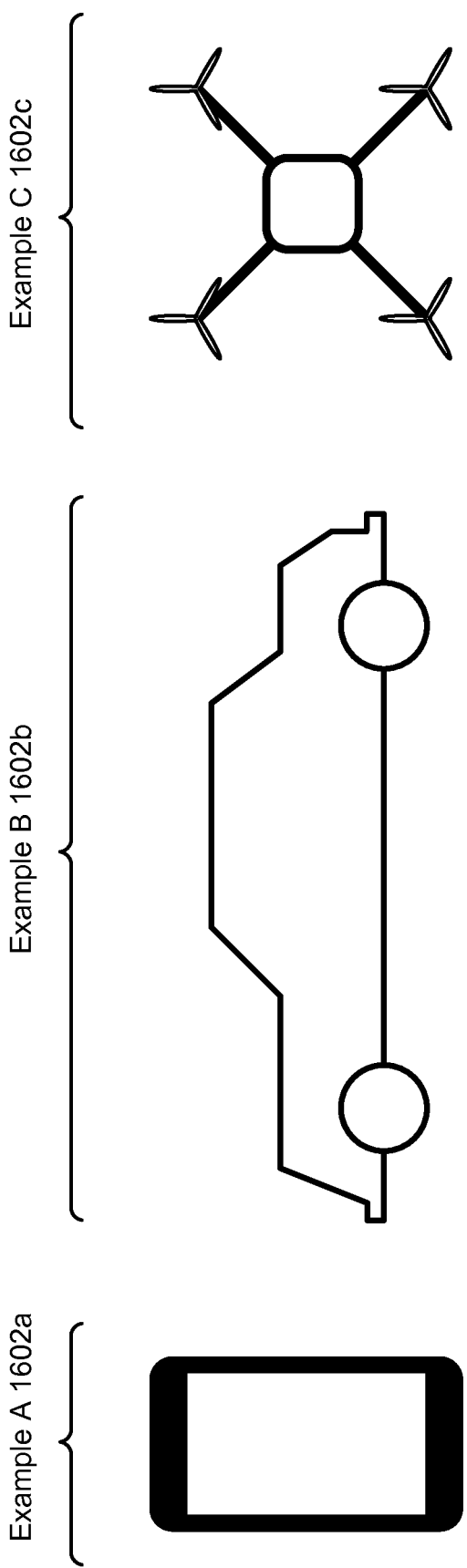
FIG. 16 illustrates examples of electronic devices in which systems and methods for object tracking may be implemented.

FIG. 16 illustrates examples 1602*a*-*c* of electronic devices in which systems and methods for object tracking may be implemented. Example A 1602*a* is a wireless communication device (e.g., smartphone, tablet device, etc.). Example B 1602*b* is an automobile. Example C is an unmanned aerial vehicle (e.g., UAV, drone, etc.).

One or more of the electronic devices 102, 1302, 1702 described herein may be implemented as (or included within) example A 1602*a*, example B 1602*b* and/or example C 1602*c*. Additionally or alternatively, one or more of the methods 300, 400, 500, 600, 1000, 1400, 1500, operations, procedures, functions and/or steps described herein may be performed by one or more of example A 1602*a*, example B 1602*b* and/or example C 1602*c*. Additionally or alternatively, one or more of the components and/or elements described herein may be implemented in one or more of example A 1602*a*, example B 1602*b* and/or example C 1602*c*.

For instance, example A 1602*a* (e.g., a smartphone) may perform one or more of the operations described above (e.g., detecting an object, recognizing an object, tracking an object, determining whether a bounding region is valid, etc.). In another instance, example B 1602*b* (an automobile) may include an ADAS that regulates speed, steering, parking, etc., of the automobile based on tracked traffic signs, signals and/or other objects (e.g., a pedestrian). In another instance, example C 1602*c* (a UAV) may record video when a person is tracked, may navigate based on tracked objects (e.g., buildings, signs, people, packages, etc.), may pick up and/or deliver a tracked package, etc. Many other examples may be implemented in accordance with the systems and methods disclosed herein. For instance, the systems and methods disclosed herein could be implemented in a robot that performs one or more actions (e.g., fetching something, assembling something, searching for an item, etc.) based on one or more tracked objects.

Figure 17:
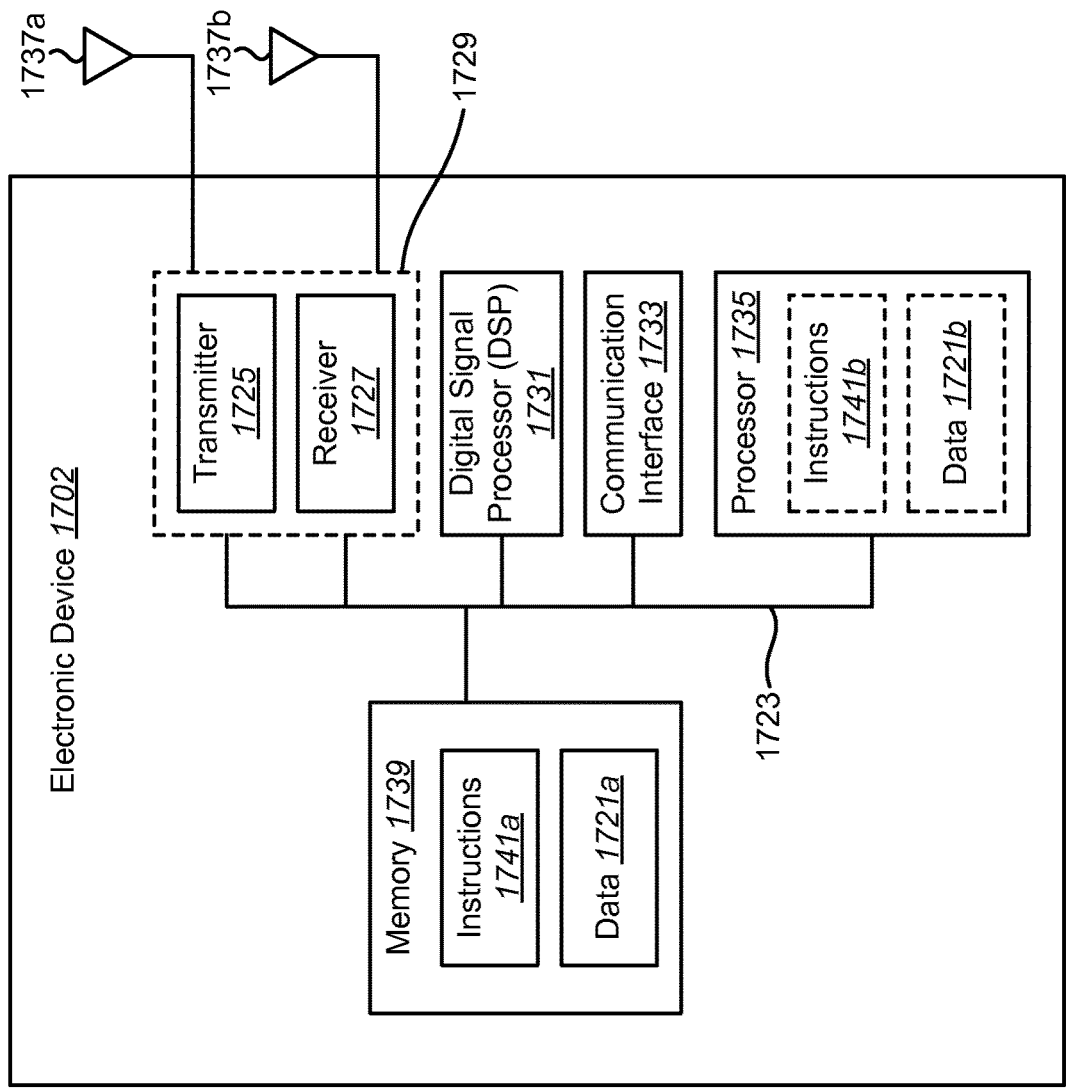
FIG. 17 illustrates certain components that may be included within an electronic device.

FIG. 17 illustrates certain components that may be included within an electronic device 1702. The electronic device 1702 may be (or may be included within) a camera, video camcorder, digital camera, cellular phone, smart phone, computer (e.g., desktop computer, laptop computer, etc.), tablet device, media player, television, automobile, personal camera, action camera, surveillance camera, mounted camera, connected camera, robot, aircraft, drone, unmanned aerial vehicle (UAV), healthcare equipment, gaming console, personal digital assistants (PDA), set-top box, etc. The electronic device 1702 includes a processor 1735. The processor 1735 may be a general purpose single- or multi-chip microprocessor (e.g., an ARM), a special purpose microprocessor (e.g., a digital signal processor (DSP)), a microcontroller, a programmable gate array, etc. The processor 1735 may be referred to as a central processing unit (CPU). Although just a single processor 1735 is shown in the electronic device 1702, in an alternative configuration, a combination of processors (e.g., an ARM and DSP) could be used.

The electronic device 1702 also includes memory 1739. The memory 1739 may be any electronic component capable of storing electronic information. The memory 1739 may be embodied as random access memory (RAM), read-only memory (ROM), magnetic disk storage media, optical storage media, flash memory devices in RAM, on-board memory included with the processor, EPROM memory, EEPROM memory, registers, and so forth, including combinations thereof.

Data 1721*a* and instructions 1741*a* may be stored in the memory 1739. The instructions 1741*a* may be executable by the processor 1735 to implement one or more of the methods described herein. Executing the instructions 1741*a* may involve the use of the data 1721*a* that is stored in the memory 1739. When the processor 1735 executes the instructions 1741, various portions of the instructions 1741*b* may be loaded onto the processor 1735, and various pieces of data 1721*b* may be loaded onto the processor 1735.

The electronic device 1702 may also include a transmitter 1725 and a receiver 1727 to allow transmission and reception of signals to and from the electronic device 1702. The transmitter 1725 and receiver 1727 may be collectively referred to as a transceiver 1729. One or multiple antennas 1737*a*-*b* may be electrically coupled to the transceiver 1729. The electronic device 1702 may also include (not shown) multiple transmitters, multiple receivers, multiple transceivers and/or additional antennas.

The electronic device 1702 may include a digital signal processor (DSP) 1731. The electronic device 1702 may also include a communication interface 1733. The communication interface 1733 may enable one or more kinds of input and/or output. For example, the communication interface 1733 may include one or more ports and/or communication devices for linking other devices to the electronic device 1702. Additionally or alternatively, the communication interface 1733 may include one or more other interfaces (e.g., touchscreen, keypad, keyboard, microphone, camera, etc.). For example, the communication interface 1733 may enable a user to interact with the electronic device 1702.

The various components of the electronic device 1702 may be coupled together by one or more buses, which may include a power bus, a control signal bus, a status signal bus, a data bus, etc. For the sake of clarity, the various buses are illustrated in FIG. 17 as a bus system 1723.

In accordance with the present disclosure, a circuit, in an electronic device, may be adapted to perform object tracking based on a first bounding region of a first frame to determine a second bounding region of a second frame, where the second frame is subsequent to the first frame. The same circuit, a different circuit, or a second section of the same or different circuit may be adapted to determine whether the second bounding region is valid based on a predetermined object model. In addition, the same circuit, a different circuit, or a third section of the same or different circuit may be adapted to control the configuration of the circuit(s) or section(s) of circuit(s) that provide the functionality described above.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio and microwave, then the coaxial cable, fiber optic cable, twisted pair, DSL, or wireless technologies such as infrared, radio and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method performed by an electronic device, comprising:
   obtaining a first frame of a scene;
   obtaining a second frame of the scene, the second frame being subsequent to the first frame;
   detecting an object in the first frame to produce a first bounding region;
   performing object recognition of an object within the first bounding region of the first frame;
   obtaining a predetermined object model corresponding to the object based on the recognition;
   extracting one or more features based on the first bounding region;
   performing object tracking of the object within the first bounding region of the first frame to determine a second bounding region in the second frame of the scene, based on the one or more features;
   checking object recognition in the second bounding region in the second frame, based on the predetermined object model;
   determining if the second bounding region is valid, wherein the second bounding region is valid if the object recognition is successful at approximately a scale, location and/or rotation of the second bounding region;
   in response to determining that the second bounding region is invalid, determining whether the object is within the second bounding region based on the predetermined object model;
   in response to determining that the second bounding region is invalid and that the object is included in the second bounding region, generating a refined bounding region by resizing the second bounding region to exclude one or more pixels that do not correspond to the object; and
   tracking the object based on the refined bounding region, wherein tracking the object based on the refined bounding region comprises extracting features based on the refined bounding region.

2. The method of claim 1, further comprising updating object tracking based on the one or more features.

3. The method of claim 1, further comprising detecting the object in a third frame after the second frame if the object is not within the second bounding region.

4. The method of claim 1, further comprising performing assisted driving based on the object.

5. The method of claim 1, wherein obtaining the predetermined object model comprises selecting the predetermined object model from a plurality of predetermined object models.

6. The method of claim 5, wherein at least one of the plurality of predetermined object models comprises a predetermined object model of a traffic sign.

7. An electronic device, comprising:
   a processor configured to:
   obtain a first frame of a scene;
   obtain a second frame of the scene, the second frame being subsequent to the first frame;
   detect an object in the first frame to produce a first bounding region;
   perform object recognition of an object within the first bounding region of the first frame;
   obtain a predetermined object model corresponding to the object based on the recognition;
   extract one or more features based on the first bounding region;
   perform object tracking of the object within the first bounding region of the first frame to determine a second bounding region in the second frame of the scene, based on the one or more features;
   check object recognition in the second bounding region in the second frame, based on the predetermined object model;
   determine if the second bounding region is valid, wherein the second bounding region is valid if the object recognition is successful at approximately a scale, location and/or rotation of the second bounding region;
   in response to determining that the second bounding region is invalid, determine whether the object is within the second bounding region based on the predetermined object model;
   in response to determining that the second bounding region is invalid and that the object is included in the second bounding region, generate a refined bounding region by resizing the second bounding region to exclude one or more pixels that do not correspond to the object; and
   track the object based on the refined bounding region, wherein tracking the object based on the refined bounding region comprises extracting features based on the refined bounding region.

8. The electronic device of claim 7, wherein the processor is configured to update object tracking based on the one or more features.

9. The electronic device of claim 7, wherein the processor is configured to detect the object in a third frame after the second frame if the object is not within the second bounding region.

10. The electronic device of claim 7, wherein the processor is configured to perform assisted driving based on the object.

11. The electronic device of claim 7, wherein the processor is configured to obtain the predetermined object model from a plurality of predetermined object models.

12. The electronic device of claim 11, wherein at least one of the plurality of predetermined object models comprises a predetermined object model of a traffic sign.

13. A computer-program product, comprising a non-transitory tangible computer-readable medium having instructions thereon, the instructions comprising:
   code for obtaining a first frame of a scene;
   code for obtaining a second frame of the scene, the second frame being subsequent to the first frame;
   code for detecting an object in the first frame to produce a first bounding region;
   code for performing object recognition of an object within the first bounding region of the first frame;
   code for obtaining a predetermined object model corresponding to the object based on the recognition;
   code for extracting one or more features based on the first bounding region;
   code for performing object tracking of the object within the first bounding region of the first frame to determine a second bounding region in the second frame of the scene, based on the one or more features;
   code for checking object recognition in the second bounding region in the second frame, based on the predetermined object model;
   code for determining if the second bounding region is valid, wherein the second bounding region is valid if the object recognition is successful at approximately a scale, location and/or rotation of the second bounding region;

code for determining whether the object is within the second bounding region based on the predetermined object model in response to determining that the second bounding region is invalid;

code for generating a refined bounding region by resizing the second bounding region to exclude one or more pixels that do not correspond to the object in response to determining that the second bounding region is invalid and that the object is included in the second bounding region; and code for tracking the object based on the refined bounding region, wherein tracking the object based on the refined bounding region comprises extracting features based on the refined bounding region.

14. The computer-program product of claim 13, the instructions further comprising code for obtaining the predetermined object model from a plurality of predetermined object models.

15. The computer-program product of claim 14, wherein at least one of the plurality of predetermined object models comprises a predetermined object model of a traffic sign.

16. An apparatus, comprising:
means for obtaining a first frame of a scene;
means for obtaining a second frame of the scene, the second frame being subsequent to the first frame;
means for detecting an object in the first frame to produce a first bounding region;
means for performing object recognition of an object within the first bounding region of the first frame;
means for obtaining a predetermined object model corresponding to the object based on the recognition;
means for extracting one or more features based on the first bounding region;
means for performing object tracking of the object within the first bounding region of the first frame to determine a second bounding region in the second frame of the scene, based on the one or more features;
means for checking object recognition in the second bounding region in the second frame, based on the predetermined object model;
means for determining if the second bounding region is valid, wherein the second bounding region is valid if the object recognition is successful at approximately a scale, location and/or rotation of the second bounding region;
means for determining whether the object is within the second bounding region based on the predetermined object model in response to determining that the second bounding region is invalid;
means for generating a refined bounding region by resizing the second bounding region to exclude one or more pixels that do not correspond to the object in response to determining that the second bounding region is invalid and that the object is included in the second bounding region; and
means for tracking the object based on the refined bounding region, wherein tracking the object based on the refined bounding region comprises extracting features based on the refined bounding region.

17. The apparatus of claim 16, wherein the means for obtaining the predetermined object models comprises means for selecting the predetermined object model from a plurality of predetermined object models.

18. The apparatus of claim 17, wherein at least one of the plurality of predetermined object models comprises a predetermined object model of a traffic sign.

* * * * *